(12) United States Patent
Mansfield

(10) Patent No.: US 8,112,246 B2
(45) Date of Patent: *Feb. 7, 2012

(54) APPARATUS FOR AND A METHOD OF DETERMINING SURFACE CHARACTERISTICS

(75) Inventor: Daniel Ian Mansfield, Leicester (GB)

(73) Assignee: Taylor Hobson Limited, Leicester (GB)

( * ) Notice: Subject to any disclaimer, the term of this patent is extended or adjusted under 35 U.S.C. 154(b) by 728 days.

This patent is subject to a terminal disclaimer.

(21) Appl. No.: 12/158,903

(22) PCT Filed: Dec. 15, 2006

(86) PCT No.: PCT/GB2006/004714
§ 371 (c)(1),
(2), (4) Date: Oct. 28, 2008

(87) PCT Pub. No.: WO2007/071944
PCT Pub. Date: Jun. 28, 2007

(65) Prior Publication Data
US 2009/0319225 A1 Dec. 24, 2009

(30) Foreign Application Priority Data

Dec. 22, 2005 (GB) .................................. 0526228.2
Jul. 19, 2006 (GB) .................................. 0614358.0

(51) Int. Cl.
*G01B 5/02* (2006.01)
(52) U.S. Cl. ...................................................... 702/172
(58) Field of Classification Search .................. 702/172; 356/497, 485, 511, 512, 487; 382/108
See application file for complete search history.

(56) References Cited

U.S. PATENT DOCUMENTS 7,385,707 B2 * 6/2008 Bankhead et al. ............ 356/497
(Continued)

FOREIGN PATENT DOCUMENTS
WO WO 03/078925 9/2003
(Continued)

OTHER PUBLICATIONS

Sanjit K. Debnath, Mahendra P. Kothiyal, Joanna Schmit, Parameswaran Hariharan; Spectrally Resolved White-light Phase-shifting Interference Microscopy for Thickness-profile Measurements of Transparent thin Film Layers on Patterned Substrates; Optics Express, vol. 14, No. 11, May 29, 2006, pp. 4662-4667, XP002427362.

(Continued)

*Primary Examiner* — Drew A Dunn
*Assistant Examiner* — Xiuquin Sun
(74) *Attorney, Agent, or Firm* — RatnerPrestia

(57) ABSTRACT

Light reflected by a sample surface region and a reference surface interfere. A detector senses light intensity at intervals during relative movement along a scan path between the sample surface and the reference surface to provide a series of intensity values representing interference fringes. A data processor receives first intensity data comprising a first series of intensity values resulting from a measurement operation on a surface area of a substrate and second intensity data including a second series of intensity values resulting from a measurement operation on a surface area of a thin film structure. A gain is determined for each thin film of the thin film structure. Substrate and apparent thin film structure surface characteristics are determined on the basis of the first and second intensity data, respectively. The apparent thin film structure surface characteristic is modified using the substrate surface characteristic and the determined gain or gains.

31 Claims, 11 Drawing Sheets

U.S. PATENT DOCUMENTS

| | | | |
|---|---|---|---|
| 7,697,726 B2* | 4/2010 | Mansfield et al. | 382/108 |
| 7,755,768 B2* | 7/2010 | Mansfield | 356/497 |
| 2002/0196450 A1* | 12/2002 | Olszak et al. | 356/511 |
| 2004/0015101 A1 | 1/2004 | Rubin et al. | |
| 2004/0189999 A1* | 9/2004 | De Groot et al. | 356/497 |
| 2005/0280829 A1 | 12/2005 | Unruh et al. | |
| 2006/0018514 A1* | 1/2006 | Bankhead | 382/108 |

FOREIGN PATENT DOCUMENTS

| | | |
|---|---|---|
| WO | WO 2006/005959 | 1/2006 |
| WO | WO 2007/060441 | 5/2007 |

OTHER PUBLICATIONS

Kim S-W et al., Thickness-Profile Measurement of Transparent Thin-Film Layers by White-Light Scanning Interferometry, Appklied Optics, OSA, Optical Society of America, Washington, D.C., US vol. 38, No. 28, Oct. 1, 1999, pp. 5968-5973, XP000873438.

Zuiker C. D. et al., In Situ Laser Reflectance Interferometry Measurement of Diamond Film Growth, Journal of Applied Physics, American Institute of Physics, New York, US, vol. 79, No. 7 Apr. 1, 1996, pp. 3541-3547, XP000593906.

Byon S. Lee, Timothy C. Strand, Profilometry with a Coherence Scanning Microscope, Published in Aplied Optics, vol. 29, No. 26, Sep. 10, 1990, pp. 3784-3788.

Daniel Malacara, Optial Shop Testing, Second Edition sections 14.4 and 14.5, pp. 506-515, York 1992.

H. Angus MacLeod, Thin-Film Optical Filters, Chapter 2, Sections 2.3, 2.4, 2.5, 2.6 and 2.7, Bristol, 2001.

Daniel Mansfield, Thin Film Extraction From Scanning White Light Interferometry, published in the Proceedings of SPIE vol. 6186, 618600, 2006, pp. 1-11.

William H. Press et al., Numerical Recipes in Fortran: The Art of Scientific Computing, Second Edition, section 10.6, pp. 413-416 and section 10.9 pp. 436-438, 1994.

* cited by examiner

APPARATUS FOR AND A METHOD OF DETERMINING SURFACE CHARACTERISTICS

BACKGROUND

This invention relates to apparatus for and a method of determining surface characteristics such as surface roughness of a thin film structure using interferometric techniques.

Techniques such as phase-stepping interferometry (PSI) and coherence scanning or broadband scanning interferometry (sometimes called "white light scanning interferometry" or "scanning white light interferometry" (SWLI)) have been used to determine surface topography. Phase shifting interferometry involves the acquisition of a number, generally four, of interferograms, at predetermined, usually quarter wavelength, intervals and the processing of these interferograms to determine the surface height of a region (surface pixel) of a surface under examination. The phase shifting method is explained in sections 14.4 and 14.5 on pages 506 to 515 of "Optical Shop Testing", Second Edition by Daniel Malacara (ISBN 0-471-52232-5). Coherence scanning or broadband interferometry determines the surface height of a surface pixel by acquiring interferograms as the path difference between the reference and measurement arms of the interferometer is changed and identifying the interferogram, and thus the position along the scan path, at which the coherence peak occurs for that surface pixel as discussed in a paper entitled "Profilometry with a Coherence Scanning Microscope" by Byron S. Lee and Timothy C Strand published in Applied Optics Volume 29, No 26 10 Sep. 1990 at pages 3784 to 3788. Coherence scanning or broadband scanning interferometry has the advantage of a longer range than phase shifting interferometry.

Measurement of the surface roughness of thin film structures by PSI or coherence scanning has proved difficult because the topography-induced phase change is corrupted by the presence of the thin film(s). Thus, in the case of coherence scanning or broadband scanning interferometry, it has proved possible to measure the surface roughness only where the layers have a thickness exceeding the coherence length of the interferometer light source so that there is a coherence peak associated with every interface and topographical perturbation measurements can be made of the film interfaces. As is well-known, the coherence length of an interferometer is a function of bandwidth and numerical aperture (NA).

SUMMARY

In one aspect, the present invention provides apparatus for and a method of determining the surface roughness of a thin film structure by modifying a measured apparent surface roughness in accordance with a model representing the difference or apparent gain in the measured surface height of a surface pixel of a layer compared with the actual surface height of that surface pixel where the gain model takes into account the effect of phase change on reflection at interfaces of the thin film structure and instrument profile characteristics.

In operation of an embodiment, light from a light source is directed along a sample path towards a region of a sample surface and along a reference path towards a reference surface such that light reflected by the region of the sample surface and light reflected by the reference surface interfere. A mover effects relative movement along a scan path between the sample surface and the reference surface. A detector senses light intensity at intervals to provide a series of intensity values representing interference fringes produced by a region of a sample surface. A data processor receives first intensity data comprising a first series of intensity values resulting from a measurement operation on a surface area of a substrate and second intensity data comprising at least a second series of intensity values resulting from a measurement operation on a surface area of a thin film structure. The data processor has a gain determiner that determines a gain for the or each thin film of a thin film structure and a surface characteristic determiner that determines a substrate surface characteristic on the basis of the first intensity data, that determines an apparent thin film structure surface characteristic on the basis of the second intensity data, and that modifies the apparent thin film structure surface characteristic using the substrate surface characteristic and the gain or gains determined by the gain determiner.

As used herein the term "gain" means the rate of change of the apparent surface height with thin film thickness.

Embodiments of the present invention will now be described, by way of example, with reference to the accompanying drawings, in which:

DETAILED DESCRIPTION

Figure 1:
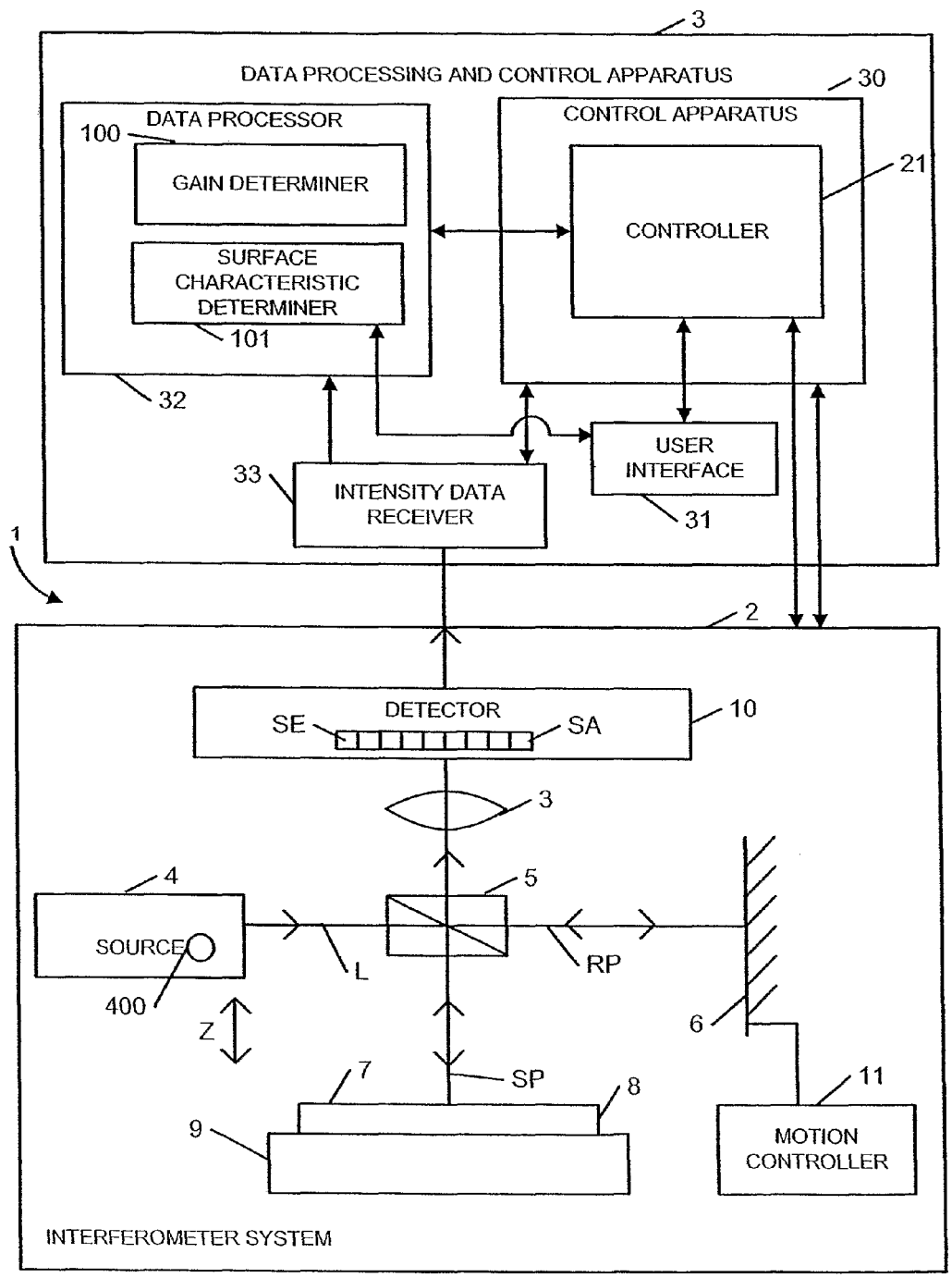
FIG. 1 shows a schematic block diagram of apparatus for determining a surface characteristic such as surface roughness of a thin film layer structure, the apparatus comprising an interferometer system and a data processing and control apparatus.

Referring now to the drawings, FIG. 1 shows a simplified schematic block diagram of apparatus 1 for determining surface characteristics, in particular the surface roughness of a thin film structure consisting of a substrate or base carrying one thin film layer or a stack of two or more thin film layers, where the surface roughness is the root mean square surface deviation corresponding to spatial wavelengths in excess of approximately 1 micrometer. A definition of surface roughness is to be found in ANSI standard B46.1 2002. As used herein, thin film layer means a substantially transmissive film layer that is sufficiently thin to exhibit interference effects, in practice a film layer having a thickness in the region of 10 s of nanometers to 100 s of nanometers so that the mean thickness of the film is less than the coherence length of the light source where the interferometer is a focussed interferometer.

The apparatus 1 has an interferometer system 2 and data processing and control apparatus 3.

The interferometer system 2 is based on a conventional interferometer and may have a Mirau, Michelson or Linnik configuration, for example. Where the interferometer system is configured to carry out phase shifting interferometry, then the interferometer will have a monochromatic light source 4 whereas where the interferometer system 2 is configured to carry out coherence scanning interferometry, the interferometer will have a broadband source 4 which may be, for example, a white light source such as a quartz halogen lamp coupled to a regulated DC power supply having a light intensity output user control 400 provided, for example, in the form of a user-rotatable knob.

The source 4 provides light L which is split by a beam splitter (illustrated in FIG. 1 as a single beam splitting prism) 5 into a first light beam which is directed along a reference path RP towards a reference mirror 6 and a second light beam which is directed along a sample path SP towards a surface 7 of a thin film structure 8 mounted on a sample support stage 9. Light reflected from the reference mirror 6 returns along the reference path RP to the beam splitter 5 where it interferes with light reflected from the surface 7 back along the sample path SP. A focussing element 3 may be provided to focus an image of the region of interference onto a detector 10.

In this embodiment, the detector 10 has a 2D (two-dimensional) array SA of image sensing elements SE, one row of which is shown very diagrammatically in FIG. 1. The array SA images an area of the sample surface 7 falling within the field of view of the detector 10. Each individual sensing element SE of the 2D sensing array of the detector 10 detects the portion of the interference pattern falling within the acceptance cone of that element and resulting from a corresponding surface region or surface pixel of the area of the sample surface 7 so that, effectively, the imaged area of the surface can be considered as a 2D array of surface regions or surface pixels. In this example, the detector 10 is a CCD (Charge Coupled Device) digital camera, for example, a Vosskuhier GmbH: CCD 1300 CCD digital camera. As another possibility, a CMOS detector having a 2D (two-dimensional) xy array of CMOS sensing elements may be used. In either case, generally each of the sensing elements is square to provide the same resolution in both directions (x and y) of the array.

A motion controller 11 is provided to effect relative movement between the thin film structure and the reference mirror 6 so as to change the difference between the lengths of the paths travelled by light reflected from the reference mirror 6 and light reflected from the sample surface 7. As shown in FIG. 1, the motion controller 11 is arranged to move the reference mirror 6 along the reference path RP. This is equivalent to moving the sample surface 7 along a scan path in the Z direction shown in FIG. 1.

The detector 10 is arranged to capture or sense the light intensity (i.e. the interference pattern) at intervals as the path length difference between the thin film structure and the reference mirror 6 is changed. Where the interferometer system is configured to carry out phase shifting interferometry, then the motion controller will cause a number, generally four, of $\lambda/4$ phase steps where $\lambda$ is the wavelength of the monochromatic light source and the detector will capture or sense the light intensity at each phase step. Where the interferometer system is configured as a coherence scanning interferometer system the motion controller will cause relative movement along a scan path and the detector will capture or sense the light intensity at intervals corresponding to axial changes in the relative position of the thin film structure of, for example, $\lambda/8$, where $\lambda$ is the nominal central wavelength of the broadband source and the step may be for example 75 nm. 2D image or frame data representing the intensity pattern for the field of view of the detector 10 is acquired by the detector 10 at each interval.

As shown in FIG. 1, the data processing and control apparatus 3 has control apparatus 30 for controlling operation of the interferometer system 2, an intensity data receiver 33 for receiving intensity data signals from the detector 10, a data processor 32 for processing the intensity data under the control of a controller 21 of the control apparatus 30 and a user interface 31 for enabling a user or operator: to control operation of apparatus; to be provided with a data output representing the results of processing by the data processor 32 of the data acquired during a measurement operation; and to enable messages such as error messages to be communicated to the user.

The controller 21 of the control apparatus 30 controls overall operation of the apparatus and communicates with the user interface 31 and data processor 32.

The data processor 32 is operable to determine surface characteristics such as surface roughness of a thin film structure and to this end comprises a surface characteristic determiner 101 for determining the interfacial surface roughness and a gain determiner 100 for determining a gain value or values for use by the surface characteristic determiner 101 in determining the interfacial surface roughness, where the term "gain" means the rate of change of the apparent surface height with thin film thickness and represents the effect on the surface roughness measurements of the actual thin film structure being measured (for example the effect of refractive indices and film thicknesses) and the optical characteristics of the interferometer system.

Figure 2:
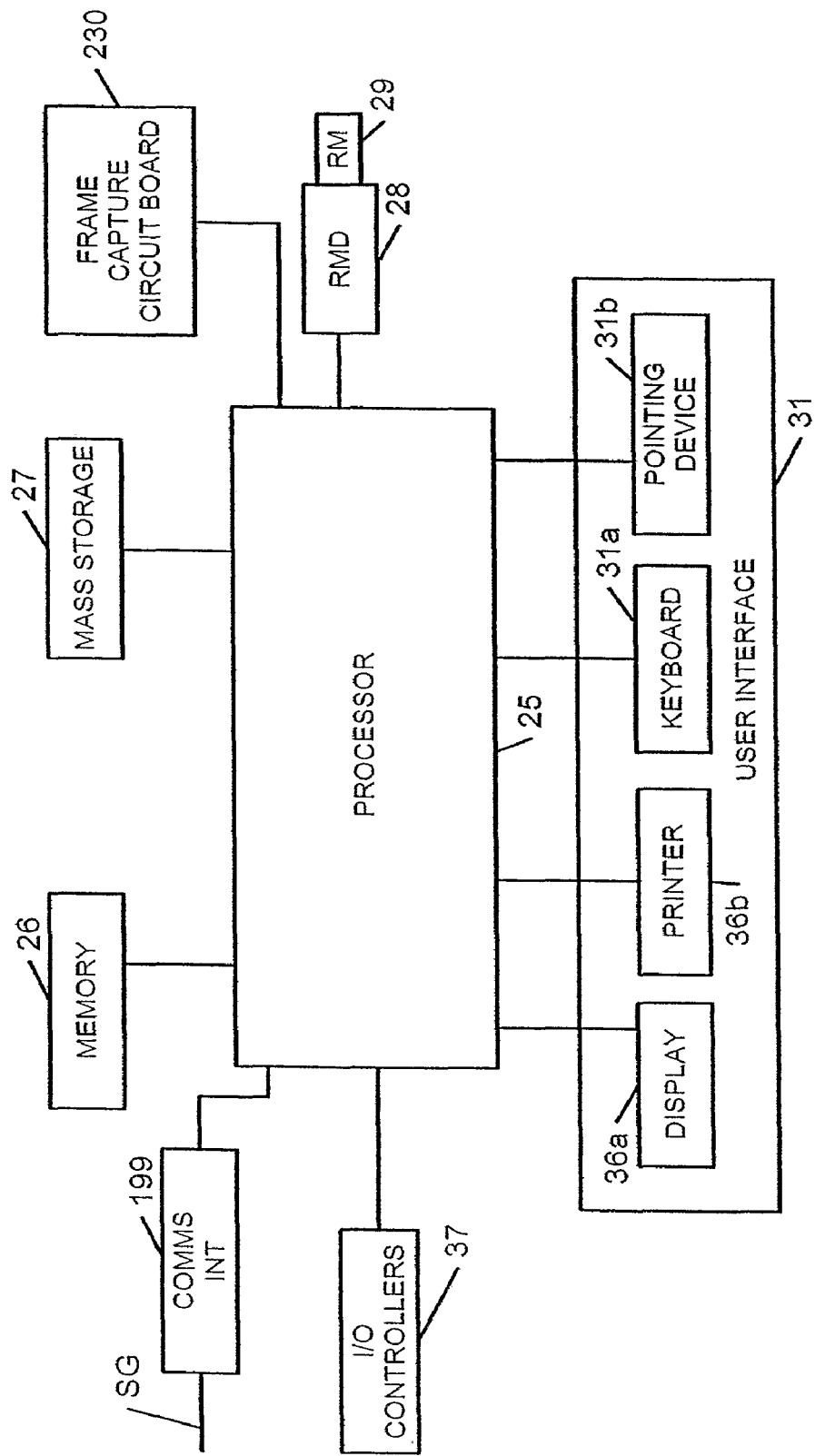
FIG. 2 shows a functional block diagram of computing apparatus that may be configured to provide the data processing and control apparatus shown in FIG. 1.

At least the controller 21 and data processor 32 of the data processing and control apparatus may be implemented by programming computing apparatus, for example a personal computer. FIG. 2 shows a simplified block diagram of such computing apparatus. As shown, the computing apparatus has a processor 25 associated with memory 26 (ROM and/or RAM), a mass storage device 27 such as a hard disk drive, a removable medium drive (RMD) 28 for receiving a removable medium (RM) 29 such as a floppy disk, CDROM, DVD or the like, input and output (I/O) controllers 37 for interfacing with the components of the broadband scanning interferometer system to be controlled by the control apparatus to enable the processor 25 to control operation of these components. The user interface 31 consists, in this example, of a keyboard 31a, a pointing device 31b, a display such as a CRT or LCD display 36a and a printer 36b. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet. In this example, the intensity data receiver 33 is provided as a dedicated frame capture circuit board 230 installed within the computing apparatus.

The processor 25 may be programmed to provide the data processor 32 and controller 21 by any one or more of the following ways: 1) by pre-installing program instructions and any associated data in a non-volatile portion of the memory 26 or on the mass storage device 27; 2) by downloading program instructions and any associated data from a removable medium 29 received within the removable medium drive 28; 3) by downloading program instructions and any associated data as a signal SG supplied from another computing apparatus via the communications interface 199; and 4) by user input via the user interface 31.

The manner in which the data processor 32 is configured to determine the surface roughness of a thin film structure will now be explained.

As a starting point consider a low numerical aperture monochromatic interferometer (where low numerical aperture means that cos θ approaches 1 and sin θ approaches θ) with the mirror of the measurement arm replaced by a thin film structure.

The surface height z (that is the path length difference between the measurement arm for that surface pixel and the reference arm) of a surface pixel x, y is represented as a measured phase and is given by:

$$\Psi = \frac{4\pi}{\lambda_o} z + \tan^{-1}\left(\frac{\text{Im}(r)}{\text{Re}(r)}\right) \quad 1)$$

where $\lambda_o$ is the wavelength of the interferometer, and Im(r) and Re(r) are the imaginary and real parts, respectively, of the electric field reflectance r.

The thin film assembly may be evaluated in known manner. For example, Abelè's matrix approach to the determination of electric field reflectance r may be used as described in, for example, sections 4.8 and 4.9 of "Optical Properties of Thin Solid Films" by O. S. Heavens published in 1991 (ISBN 0-486-66924-6). As another possibility, the electric field reflectance r of the thin film structure may be calculated by using the concept of optical admittance as described in, for example, sections 2.3, 2.4, 2.5, 2.6 and 2.7 of "Thin-Film Optical Filters" by H Angus Macleod (ISBN 0 7503 0688 2). Other approaches may also be possible.

From equation 1 above, a perturbation dΨ to the measured phase resulting from a perturbation in the surface height z of a surface pixel gives:

$$d\Psi = \frac{4\pi}{\lambda_o}\left(dz_{subs} + \sum_{k=1}^{m} dz_k\right) + \sum_{k=1}^{m} \frac{\partial \chi}{\partial z_k} dz_k \quad 2)$$

where dz is the change or perturbation in the substrate surface height and $dz_k$ is the change or perturbation in the surface height of the $k^{th}$ thin film layer and where, for brevity:

$$\chi = \tan^{-1}\left(\frac{\text{Im}(r)}{\text{Re}(r)}\right) \quad 3)$$

In equation 2), the first two terms represent the phase terms corresponding to the geometrical perturbation and the last term represents the perturbation in the phase change on reflection.

From the above $$\tan\chi = \frac{\text{Im}(r)}{\text{Re}(r)} \quad 4)$$

Recollecting that the differential of tan x is sec²x and that the differential of u/v is $$\left(v\left(\frac{du}{dx}\right) - u\left(\frac{du}{dx}\right)\right)\frac{1}{v^2} \quad 5)$$

then the differential of equation 4) is:

$$\sec^2\chi \frac{\partial \chi}{\partial z_k} = \frac{\text{Re}(r)\frac{\partial (\text{Im}(r))}{\partial z_k} - \text{Im}(r)\frac{\partial (\text{Re}(r))}{\partial z_k}}{\text{Re}^2(r)} \quad 6)$$

and thus $$\cos^2\chi = \frac{\text{Re}^2(r)}{\text{Re}^2(r) + \text{Im}^2(r)} = \frac{\text{Re}^2(r)}{R} \quad 7)$$

so that $$\frac{\partial \chi}{\partial z_k} = \frac{1}{R}\left(\text{Re}(r)\frac{\partial (\text{Im}(r))}{\partial z_k} - \text{Im}(r)\frac{\partial (\text{Re}(r))}{\partial z_k}\right) \quad 8)$$

For a monochromatic light source of wavelength $\lambda_o$, the perturbation equation 2) becomes:

$$d\Psi = \frac{4\pi}{\lambda_o} dz_{subs} + \sum_{k=1}^{m}\left(\frac{4\pi}{\lambda_o} + \frac{1}{R}\left(\text{Re}(r)\frac{\partial (\text{Im}(r))}{\partial z_k} - \text{Im}(r)\frac{\partial (\text{Re}(r))}{\partial z_k}\right)\right) dz_k \quad 9)$$

Because of the assumption that the interferometer phase Ψ is exclusively due to surface topography, the general perturbation equation for the apparent surface height or z-perturbation (that is the z-perturbation that would be determined by the data processing and control apparatus) $dz_{app}$ for a surface pixel is:

$$dz_{app} = dz_{subs} + \sum_{k=1}^{m}\left(1 + \frac{1}{4\pi v_o R}\left(\text{Re}(r)\frac{\partial (\text{Im}(r))}{\partial z_k} - \text{Im}(r)\frac{\partial (\text{Re}(r))}{\partial z_k}\right)\right) dz_k \quad 10)$$

$$= dz_{subs} + \sum_{k=1}^{m} G_k(v_o) dz_k$$

where $v_o$ is the frequency of the wavelength $\lambda_o$ of the monochromatic interferometer system, and $G_k$ is a gain value for the $k^{th}$ layer and represents the amount by which the actual z-perturbation $dz_k$ for the $k^{th}$ layer has to be multiplied by to obtain the apparent z-perturbation for the $k^{th}$ layer. The gain values $G_k$ correspond, for each thin film, to the rate of change of the apparent surface height with that thin film thickness and the gain values as a set represent the effect on the surface roughness measurements of the actual thin film structure being measured (for example the effect of refractive indices and film thicknesses) and the optical characteristics of the interferometer system, where the optical characteristics are, in this example, the interferometer wavelength and the numerical aperture. In the case being described of a monochromatic interferometer of low numerical aperture, then $$G_k = \frac{\lambda_O}{4\pi} \cdot \frac{\partial \varphi}{\partial z_k}$$

For the simple case of a single non-absorbing thin film, the gain determiner 100 may be configured to evaluate the gain $G_1(v_o)$ of the single thin film analytically. More generally, the gain determiner 100 will be configured to evaluate the gain values $G_k(v_o)$ by numerical differentiation. Thus, for the $k^{th}$ thin film, the gain determiner 100 will evaluate partial derivatives of equation 10 as follows:

$$\frac{\partial \mathrm{Im}(r)}{\partial z_k} \cong \frac{\mathrm{Im}(r_{z_k + \Delta z_k}) - \mathrm{Im}(r_{z_k - \Delta z_k})}{2\Delta z_k} \quad 11a)$$

and $$\frac{\partial \mathrm{Re}(r)}{\partial z_k} \cong \frac{\mathrm{Re}(r_{z_k + \Delta z_k}) - \mathrm{Re}(r_{z_k - \Delta z_k})}{2\Delta z_k} \quad 11b)$$

where $\Delta z_k$ is a perturbation that represents a very small change in the physical thickness of the $k^{th}$ thin film layer with the value of $\Delta z_k$ being the same for each thin film layer k. The gain determiner 100 obtains the electric field reflectances $r_{z_k}$ of the k layers by taking advantage of the plane-wave angular spectrum approach discussed in "The distorted helix: Thin film extraction from scanning white light interferometry" by Daniel Mansfield published in the Proceedings of SPIE Volume 6186, 61860O, 2006 at pages 1 to 11 where the originals and p field reflectances are evaluated using, for example, the standard matrix-based approach as presented in Chapter 2 of the aforementioned text book by Macleod using known or provided values for the substrate and thin film layer refractive indices and the respective nominal thickness of each of the thin film layers, that is the thicknesses specified by the designer of the thin film assembly. Once equations 11a and 11b have been evaluated, then the gain determiner 100 determines the gain values $G_k$ in accordance with:

$$1 + \frac{1}{4\pi v_o R}\left(\mathrm{Re}(r)\frac{\partial(\mathrm{Im}(r))}{\partial z_k} - \mathrm{Im}(r)\frac{\partial(\mathrm{Re}(r))}{\partial z_k}\right) \quad 11c)$$

The determined gain values are stored by the gain determiner 100.

The manner in which the surface characteristic determiner 101 is configured to determine a surface characteristic will now be described.

When a measurement of surface roughness is made using the apparatus, then the apparent measured surface roughness $Sq^2_{app}$ is given by:

$$Sq^2_{app} = Sq^2_{subs} + \sum_{k=1}^{m} G_k^2(v_o) T_k^2 \quad 12a)$$

where m is the number of layers in the thin film structure and $T_k$ is the root mean square thickness of the $k^{th}$ thin film layer.

In order to determine the actual substrate roughness $Sq_{subs}$ and the root mean square thickness $T_k$ of each thin film layer of a thin film assembly having m layers then the surface characteristic determiner 101 is configured to solve m+1 simultaneous equations:

$$\begin{pmatrix} 1 & G_{11}^2 & G_{12}^2 & \ldots & G_{1m}^2 \\ 1 & G_{21}^2 & G_{22}^2 & \ldots & G_{2m}^2 \\ \ldots & \ldots & \ldots & & \ldots \\ 1 & G_{m+1,1}^2 & G_{m+1,2}^2 & \ldots & G_{m+1,m}^2 \end{pmatrix} \begin{pmatrix} Sq^2_{subs} \\ T_1^2 \\ T_2^2 \\ \ldots \\ T_m^2 \end{pmatrix} = \begin{pmatrix} Sq^2_{app1} \\ Sq^2_{app2} \\ Sq^2_{app3} \\ \ldots \\ Sq^2_{appm+1} \end{pmatrix} \quad 12b)$$

where $G_{11}$ to $G_{m+1, m}$ are the gain values stored by the gain determiner 100. Accordingly, the surface characteristic determiner 101 prompts the user to cause the apparatus to make at least m+1 different measurements of apparent surface roughness $Sq^2_{app1}$ to $Sq^2_{appm+1}$ on m different thin film structure samples that differ from one another only in at least one of the thickness of one or more of the thin film layers and the number of thin film layers. Thus, the material forming the substrate and the materials and the sequence or order of thin film material layers will be the same for each sample, although the number of thin film layers and thicknesses differ between samples. Once the m+1 different measurements of apparent surface roughness have been made, then the surface characteristic determiner 101 can solve equation 12b) for the substrate roughness $Sq_{subs}$ and for each of the root mean square thicknesses $T_1, T_2, T_3, \ldots T_m$, because all the gain terms $G_{11}$ to $G_{m+1, m}$ have been determined by the gain determiner 100.

From a purely geometric point of view the front surface perturbation dz is given by:

$$dz = dz_{subs} + \sum_{k=1}^{m} dz_k \quad 13)$$

so that the corresponding actual top surface roughness is given by:

$$Sq^2 = Sq^2_{subs} + \sum_{k=1}^{m} T_k^2 \quad 14a)$$

The surface characteristic determiner 101 is configured to determine the actual top surface roughness Sq of the surface of the thin film assembly as the sum of the individual mean thin film thicknesses $T_k$ plus the substrate roughness:

$$Sq^2 = Sq^2_{subs} + T_1^2 + T_2^2 \ldots + T_m^2 \quad 14b)$$

As described above, the m+1 different measurements of apparent surface roughness $Sq^2_{app1}$ to $Sq^2_{appm+1}$ are made on m different thin film structure samples. As another possibility, the m+1 measurements may be made on a single sample. In this case, the m+1 measurements comprise a first measurement of the apparent surface roughness of the uncoated substrate followed by successive measurements of the surface roughness of the thin film layers. This may be achieved by designing the thin film structure so that a measurement region of the substrate and each thin film layer is exposed in the final thin film structure or by making the measurements during manufacture so that the thin film layers are sequentially manufactured and then measured both in terms of apparent surface topography and in terms of mean layer thickness (by, for example, an ellipsometer), one layer at a time. In this case, corresponding surface pixels on successive surfaces (the substrate surface and successive thin film surfaces) should be in registration with one another. If surface pixel registration is maintained throughout the thin film structure, then the surface characteristic determiner 101 may also evaluate the entire set of thickness departures ($\Delta z_k(x,y)$) from the mean layer thicknesses together with the substrate local departure, $\Delta z_{subs}(x,y)$ in accordance with:

$$\begin{pmatrix} 1 & 0 & 0 & \ldots & 0 \\ 1 & G_{21} & 0 & \ldots & 0 \\ 1 & G_{31} & G_{32} & 0 & \ldots \\ \ldots & \ldots & \ldots & \ldots & \ldots \\ 1 & G_{m+1,1} & G_{m+1,2} & \ldots & G_{m+1,m} \end{pmatrix} \begin{pmatrix} \Delta z_{subs}(x,y) \\ \Delta z_1(x,y) \\ \Delta z_2(x,y) \\ \ldots \\ \Delta z_n(x,y) \end{pmatrix} = \begin{pmatrix} \Delta z_{subs}(x,y) \\ \Delta z_{app1}(x,y) \\ \Delta z_{app2}(x,y) \\ \ldots \\ \Delta z_{appm}(x,y) \end{pmatrix} \quad 14c)$$

The case of a thin film structure consisting of a single thin film on a substrate will now be considered because it is a type of thin film structure that occurs frequently in practice and represents a case for which the equations are tractable as an analytical expression.

Considering a non-absorbing thin film, then following Abelès and the above-mentioned sections of the afore-mentioned text book by O. S. Heavens:

$$\begin{pmatrix} E^+ \\ E^- \end{pmatrix} = \frac{1}{t_2}\begin{pmatrix} 1 & r_2 \\ r_2 & 1 \end{pmatrix}\frac{1}{t_1}\begin{pmatrix} e^{i\delta_1} & r_m e^{i\delta_1} \\ r_1 e^{-i\delta_1} & e^{-i\delta_1} \end{pmatrix}\begin{pmatrix} 1 \\ 0 \end{pmatrix} \quad 15)$$

where $r_1$ and $r_2$ are the electric field reflectance at the film/substrate interface and the air/thin film interface, respectively, $E^+$ and $E^-$ are the reflected and incident electric fields, and $t_1$ and $t_2$ are the electric field transmittance at the film/substrate interface and the air/thin film interface, respectively.

Thus:

$$r = \frac{E_-}{E^+} = \frac{r_1 e^{-i\delta_1} + r_2 e^{i\delta_1}}{e^{i\delta_1} + r_1 r_2 e^{-i\delta_1}} \Rightarrow R = r \cdot r^* = \frac{r_1^2 + r_2^2 + 2r_1 r_2 \cos 2\delta_1}{1 + r_1^2 r_2^2 + 2r_1 r_2 \cos 2\delta_1} \quad 16)$$

$$\operatorname{Re}(r) = \frac{r_1(1+r_2^2)\cos 2\delta_1 + r_2(1+r_1^2)}{1 + r_1^2 r_2^2 + 2r_1 r_2 \cos 2\delta_1} \quad 17)$$

$$\operatorname{Im}(r) = -\frac{r_1(1-r_2^2)\sin 2\delta_1}{1 + r_1^2 r_2^2 + 2r_1 r_2 \cos 2\delta_1} \quad 18)$$

Differentiating equations 17 and 18 gives:

$$\frac{\partial \operatorname{Re}(r)}{\partial z_1} = \frac{-2r_1(1+r_2^2)\sin 2\delta_1 + 4\operatorname{Re}(r)r_1 r_2 \sin 2\delta_1}{1 + r_1^2 r_2^2 + 2r_1 r_2 \cos 2\delta_1}\left(\frac{d\delta_1}{dz_1}\right) \quad 19)$$

$$\frac{\partial \operatorname{Im}(r)}{\partial z_1} = \frac{-2r_1(1-r_2^2)\cos 2\delta_1 + 4\operatorname{Im}(r)r_1 r_2 \sin 2\delta_1}{1 + r_1^2 r_2^2 + 2r_1 r_2 \cos 2\delta_1}\left(\frac{d\delta_1}{dz_1}\right) \quad 20)$$

where the phase:

$$\delta_1 = 2\pi v_o n(v_o) z_1 \quad 21a)$$

and $$\frac{d\delta_1}{dz_1} = 2\pi v_o n(v_o) \quad 21b)$$

so that, for the low numerical aperture under consideration the gain expression to be calculated by the gain determiner 100 for the single thin film structure $G_1(v_o)$ becomes:

$$1 + \frac{1}{4\pi v_o R}\left(\operatorname{Re}(r)\frac{\partial(\operatorname{Im}(r))}{\partial z_k} - \operatorname{Im}(r)\frac{\partial(\operatorname{Re}(r))}{\partial z_k}\right) \quad 22)$$

and is analytically known.

Figure 3:
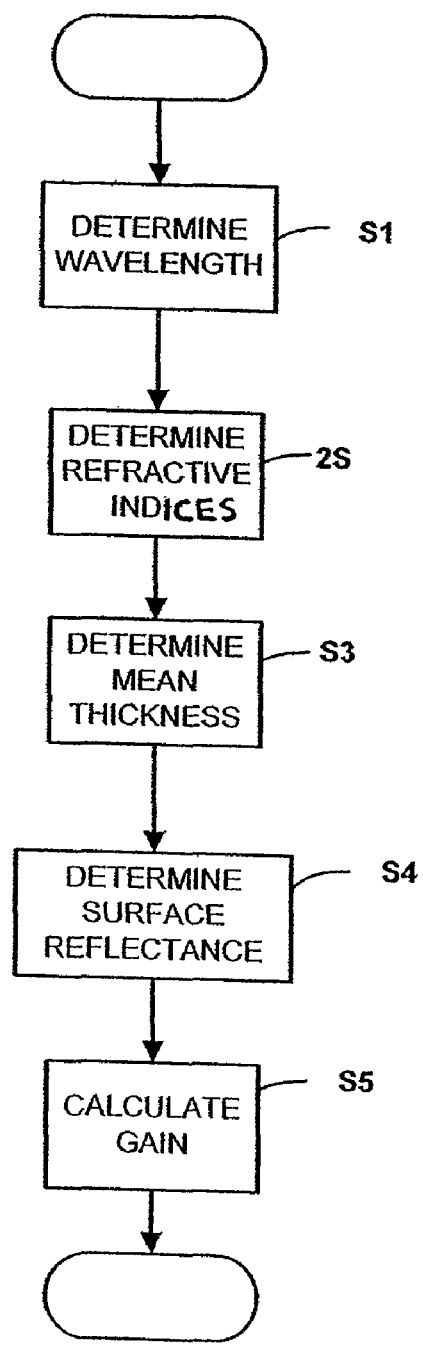
FIG. 3 shows a flow chart to illustrate operations carried out by a gain determiner of the data processor shown in FIG. 1.
Figure 4:
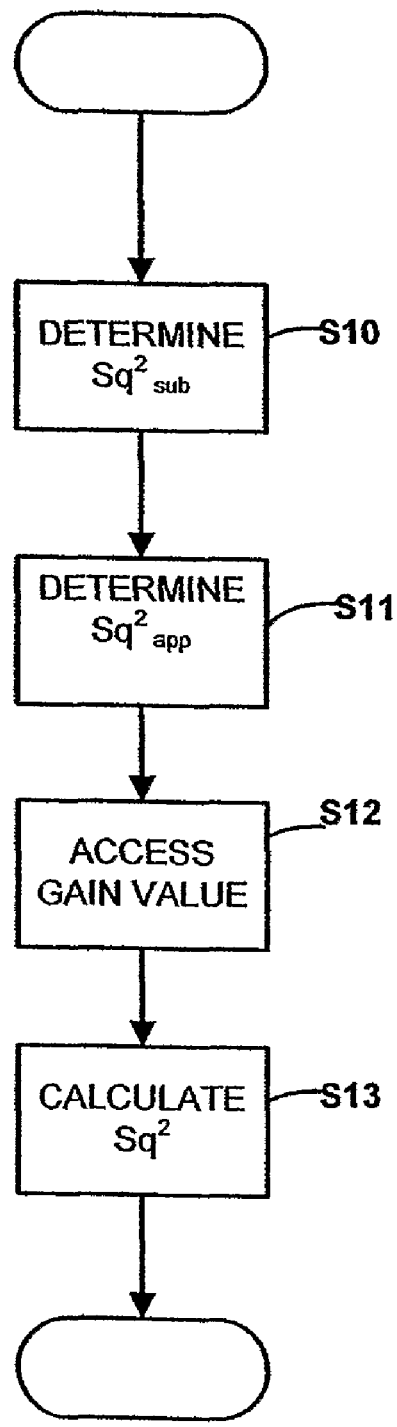
FIG. 4 shows a flow chart to illustrate operations carried out by a surface characteristic determiner of the data processor shown in FIG. 1.

FIGS. 3 and 4 show flow charts for illustrating the operation of the apparatus in this case, that is where the apparatus shown in FIG. 1 is configured as a low numerical aperture monochromatic interferometer and to carry out phase shifting interferometry where the sample comprises a thin film structure having a single thin film layer and the interfacial surface roughness to be determined is the thin film-ambient atmosphere (usually air) interface surface roughness.

FIG. 3 shows a flow chart illustrating one way in which the gain determiner 101 may determine the gain for a thin film structure having a single thin film.

In this example, the gain determiner 100 first determines the operational wavelength λ of the interferometer at S1, the refractive indices of the substrate and the single thin film layer at S2 and the expected or specified mean thin film thickness of the single thin film layer at S3. It will of course be appreciated that the order in which these are determined is not important and that, for example, the thin film thickness could be determined first. The operational wavelength may be pre-stored by the apparatus or input by the user using the user interface 31 in response to a prompt issued via the user interface 31. The refractive index and mean film thickness will generally be input by the user using the user interface 31 in response to a promp tissued via the user interface 31. The refractive index may be determined by any appropriate conventional manner (for example, ellipsometry or spectrophotometry) or may be supplied by the manufacturer of the sample. The expected or specified mean thin film thickness may be determined by, for example, ellipsometry or spectrophotometry or by using the techniques described in WO2006/005959 or may be supplied by the manufacturer of the sample.

The gain determiner 100 then determines at S4 the surface electric field reflectance r by using the standard matrix relationship as discussed in the afore-mentioned text book by Macleod.

At S5, the gain determiner 100 calculates the gain $G_1(v_o)$ of the single thin film either analytically or by numerical differentiation as discussed above with respect to equations 10, 11a and 11b and 22.

The gain $G_1$ is thus dependent upon the refractive index and mean thin film thickness of the single thin film plus the refractive index of the substrate and the measurement wavelength of the monochromatic light source. In the example set out above, the mean thin film thickness of the single thin film is supplied by the user. The refractive indices may be supplied by the user or may be determined by the gain determiner 100 from information supplied by the user that identifies the materials forming the substrate and the layer and a data base (which may be local to the apparatus or may be accessed over a network or other communications link) of material refractive indices. The measurement wavelength of the monochromatic light source may be pre-stored by the gain determiner 100 or provided by the controller 21.

In the above example, the gain $G_1$ is calculated at the time the user wishes to determine the surface roughness of the thin film structure. As another possibility, the gain determiner 100 or the controller 21 may store a look-up table or similar data set giving the calculated gain $G_1$ for different combinations of substrate refractive index, thin film refractive index and mean thin film thickness, in which case-the-gain determiner 100 will simply look-up rather than calculate the gain $G_1$ when the user inputs the refractive index and mean thin film thickness.

As another possibility or additionally, the gain determiner 100 or the controller 21 may store a look-up table or similar data set giving the calculated gain $G_1$ for a number of different thicknesses of each of a number of specific thin film materials. In this case the user may be prompted to input the mean thin film thickness and data identifying the material rather than the refractive index. Of course, if a particular material may vary in refractive index then the user will be prompted either to input the refractive index or to further identify the material.

If the gain determiner 100 calculates the gain as being approximately zero, then the gain determiner 100 will instruct the controller 21 to advise the user, via the user interface 31, that no gain compensation will be feasible because of the poor signal to noise ratio and, if a different measurement wavelength is available, will advise the user that the measurement wavelength should be changed to change the gain. If this is not possible then the controller 21 will advise the user via the user interface 31 that the interferometric measurement of the thin film sample should be abandoned.

FIG. 4 illustrates determination of the interfacial surface roughness for the single thin film thin film structure using the gain $G_1$ determined by the gain determiner 100.

At S10 in FIG. 3, the surface characteristic determiner 101 determines a value for the surface roughness $Sq^2_{sibs}$ of the substrate. Generally, this will be determined by prompting the user, via the user interface 31, to cause the sample support stage to be moved under the control of the control apparatus to bring a part of the sample free of the thin film into the field of view of the interferometer and then to instruct the control apparatus to carry out a measurement operation in which, for each surface pixel in the field of view, the detector senses the light intensity at each of the number of phase steps and the surface characteristic determiner 101 then determines the phase and thus the surface height for each of those surface pixels in accordance with the usual phase shifting equations as set out in the above-mentioned sections of Optical Shop Testing by Daniel Malacara. The substrate surface roughness $Sq^2_{subs}$ will then be determined as being the square of the deviation in z of the measured surface pixels.

At S11, the surface characteristic determiner 101 determines the apparent surface roughness $Sq^2_{app}$ for the single thin film of the thin film structure. Generally, this will be determined by prompting the user, via the user interface 31, to cause the sample support stage to be moved under the control of the control apparatus to bring apart of the sample carrying the thin film into the field of view of the interferometer and then to instruct the control apparatus to carry out a measurement operation in which, for each surface pixel in the field of view, the detector senses the light intensity at each of the number of phase steps and the surface characteristic determiner 101 then determines the phase and thus the surface height $z_{app}$ for each of those surface pixels in accordance with the usual phase shifting equations or phase shifting algorithm as set out in above-mentioned sections of Optical Shop Testing by Daniel Malacara. The thin film surface roughness $Sq^2_{app}$ will then be determined as being the square of the deviation in z of the measured surface pixels.

It will of course be appreciated that S10 and S11 could be carried out in reverse order. Also, once the apparent surface roughness measurements have been made for a particular thin film structure sample, then those measurements may be used during the determination of the surface roughness of other thin film structures produced from the same materials and using the same process conditions which differ only in thin film layer thicknesses. The thin film structure on which the apparent surface roughness measurements are made may be designed to have thin film thicknesses that maximise the signal-to-noise ratio in the gain curve.

At S12, the surface characteristic determiner 101 accesses the gain value $G_1$ determined by the gain determiner 100 and at S13 calculates the actual top surface roughness $Sq^2$. In accordance with equation 14 above, the actual surface roughness is given by $$Sq^2 = Sq^2_{subs} + T_1^2 \qquad 23)$$

so that, in accordance with equation 12 above, the measured or apparent surface roughness $Sq^2_{app}$ is given by:

$$Sq_{app}^2 = Sq_{subs}^2 + G_1^2(v_o)T_1^2 \qquad 24)$$

rearranging equation 24 gives:

$$T_1^2 = \frac{Sq^2_{app} - Sq^2_{subs}}{G_1^2(v_o)} \qquad 25)$$

Thus, at S13 the surface characteristic determiner 101 calculates:

$$Sq^2 = T_1^2 + Sq^2_{subs} = \frac{Sq^2_{app} + (G_1^2(v_o) - 1)Sq^2_{subs}}{G_1^2(v_o)} \qquad 26)$$

and corrects or compensates the surface roughness Sq. As discussed above with respect to equation 14c), if the measurements of apparent surface roughness are made on a single sample and corresponding surface pixels of the substrate and the thin film are aligned, then it may also be possible to determine the surface height z on a surface pixel-by-surface pixel basis.

If the surface characteristic determiner 101 determines that the thin film RMS thickness is much greater (for example approximately three times greater) than the substrate surface roughness:

$$T_1 \gg Sq_{subs} \qquad 27)$$

then the surface characteristic determiner 101 decides that it is reasonable to carry out an approximate calculation to determine Sq as follows:

$$Sq^2 \approx Sq_{app}^2/G_1^2(v_o)(dz \approx dz_{app}/G_1(v_o)) \qquad 28)$$

Figure 5:
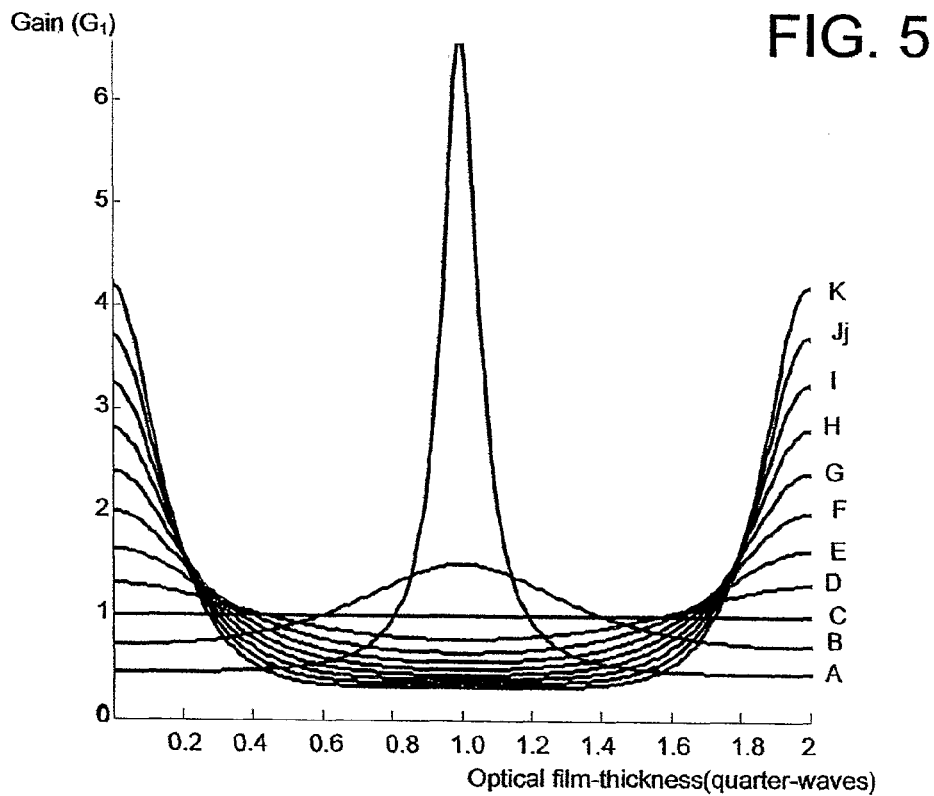
FIG. 5 shows a graph of the gain determined by the gain determiner against optical thickness for single thin films on substrates where the single thin films have different refractive indices and the interferometer is a monochromatic low numerical aperture interferometer.
Figure 6:
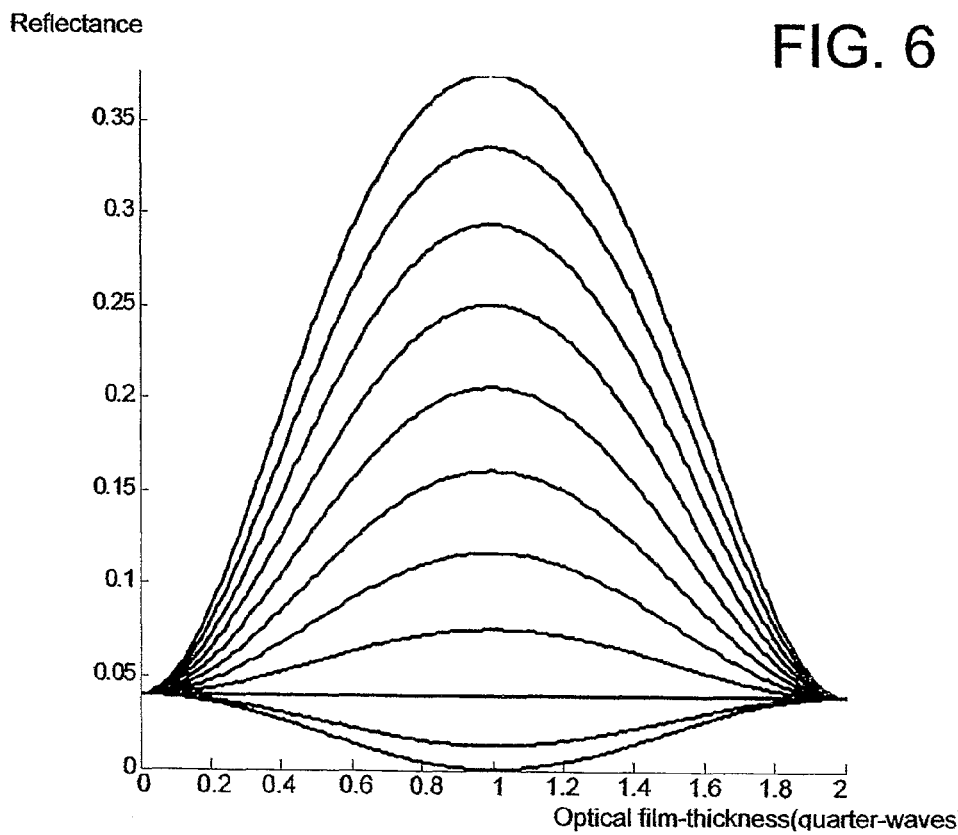
FIG. 6 shows a graph of reflectance r against film thickness for a range of different refractive indices.

FIG. 5 shows the gain ($G_1$) determined by the gain determiner 100 for a number of sets A to K of thin film structures each of which consists of a single thin film on a substrate having a refractive index of 1.5. The refractive index of the thin films varies from 1.25 for set A to 2.5 for set K and within each set A to K the thin film optical thickness varies from zero to $\lambda/2$ where $\lambda$ is the wavelength of the monochomatic source of the interferometer system. As a zero film thickness is approached, the gain increases as the refractive index increases. FIG. 6 shows the reflectance r as a function of film thickness for the same range of refractive indices (1.25 to 2.5) and a substrate refractive index of 1.5. At a quarter-wavelength thickness, the maximum reflectance is exhibited by the film of highest index.

The above described operation of the gain determiner 100 and the surface characteristic determiner 101 is for a thin film structure having a single thin film layer. The apparatus may be configured to enable the interfacial surface roughness to be determined only for thin film structures having a single layer.

As another possibility, the apparatus may be configured to enable the interfacial surface roughness to be determined for thin film structures having one or more thin film layers. In the latter case, the controller 21 will prompt the user to provide the number of thin film layers and the mean film thickness and refractive index for each thin film layer and will provide instructions to the user to enable measurements of the apparent surface roughness of a region of each thin film in the thin film structure in addition to the measurement of the apparent surface roughness of the substrate. As set out above, instead of providing the refractive index, the user may provide information identifying the material so that the refractive index can be obtained from a data base accessible by the apparatus.

For thin film structures have more than one thin film layer, the gain determiner 100 will calculate gain values $G_k(v_o)$ for the thin film structure in accordance with equation 10 above while the surface characteristic determiner 101 will determine the interfacial surface roughness in accordance with equations 12 and 14 above. Gain values $G_k(v_o)$ calculated for thin film structures may be stored by the gain determiner 100 in association with the details of that thin film structure so that, if the gain determiner 100 determines that the thin film details entered by the user match those of a structure for which the gain values have already been calculated, recalculation is not necessary.

It is clear from equation 12b that there are n+1 unknowns for a thin film assembly with n films and that therefore n+1 measurements will be required. In the case of a two thin-film structure, then from equation 12:

$$Sq_{app}^2(1) = Sq_{subs}^2 + G_{11}^2 T_1^2$$

$$Sq_{app}^2(2) = Sq_{subs}^2 + G_{12}^2 T_1^2 + G_{22}^2 T_2^2 \quad 29)$$

where $G_{11}$ is the gain for the first thin film layer in the absence of the second thin film layer, $G_{12}$ is the gain for the first thin film layer when the second thin film layer has been provided on top of the first thin film layer, and $G_{22}$ is the gain of the second thin film layer (the dependence on $v_o$ has been omitted in equation 29 in the interests of simplicity and because the interferometer in question is a monochromatic one).

Thus, if the data provided by the user indicates that the thin film structure comprises a stack of two thin films, then the gain determiner 100 will carry out calculations in accordance with equation 10 to determine the gains $G_{11}$, $G_{12}$ and $G_{22}$ and the controller 21 will advise the user to make measurements of the apparent surface roughness of the uncoated substrate ($Sq_{app}(2)$), the first layer only ($Sq_{app}(1)$) and the surface of the two-film thin film structure ($Sq_{app}(2)$). In order to measure the surface roughnesses $Sq_{subs}$ and $Sq_{app}(1)$ exposed parts of the substrate surface and first thin film layer need to be brought into the field of view of the interferometer. These measurements may, but need not necessarily, be made on the same sample. Thus, the measurements may be made on one, two or three samples, provided that the samples are produced by the same process using the same substrate material and the same thin film materials and material layer order. As discussed above, the thickness of a thin film on which a measurement is to be made may be selected so as to optimise the signal to noise ratio in the gain curve.

In this case, in accordance with equations 12 and 14, the surface characteristic determiner 101 determines the top surface roughness as:

$$Sq^2 = T_1^2 + T_2^2 + Sq_{subs}^2 = \frac{1}{G_{22}^2}\left(Sq_{app}^2(2) + \frac{G_{22}^2 - G_{12}^2}{G_{11}^2}Sq_{app}^2(1) + \left(G_{22}^2 - 1 - \frac{G_{22}^2 - G_{12}^2}{G_{11}^2}\right)Sq_{subs}^2\right) \quad 30)$$

As discussed above with respect to equation 14c), if the measurements of apparent surface roughness are made on a single sample and corresponding surface pixels of the substrate and the thin films are aligned, then it may also be possible to determine the surface height z on a surface pixel-by-surface pixel basis.

As set out above, once the apparent surface roughness measurements have been made for a particular thin film structure sample, then those measurements may be used during the determination of the actual top surface roughness of other thin film structures produced from the same materials and using the same process conditions but which may have different thin film layer thicknesses so that it is not necessary to provide measurement access to each thin film layer surface in those other thin film structures.

It will be apparent from equations 12a, 12b, 24 and 29 that the surface characteristic determiner 101 may determine a value for the root mean square thickness of the or one of the thin film layer as an alterative to or in addition to the actual top surface roughness. Such a value may be used, for example, to determine whether the thin film assembly meets manufacturing quality control tolerances.

The explanation above assumes a low numerical aperture interferometer. A typical phase-stepping interferometer may, however, use a Mirau, Linnik or Michelson interference objective to magnify and image the surface in question. The basic relationship of equation 10 will then be modified to read:

$$G_k(v_o) = 1 + \frac{1}{4\pi v_o R \cos\overline{\theta}}\left(\text{Re}(r)\frac{\partial(\text{Im}(r))}{\partial z_k} - \text{Im}(r)\frac{\partial(\text{Re}(r))}{\partial z_k}\right) \quad 31)$$

where: $\overline{\theta}$ is the weighted mean angle of incidence of light from the interferometer on the top surface of the thin film assembly; $G_k(v_o)$ is as set out above a function of the electrical field reflectance r which is obtained by taking advantage of the plane-wave angular spectrum approach discussed in "The distorted helix: Thin film extraction from scanning white light interferometry" by Daniel Mansfield published in the Proceedings of SPIE Volume 6186, 61860O, 2006 at pages 1 to 11 where the original s and p field reflectances are evaluated using, for example, the standard matrix-based approach as presented in Chapter 2 of the aforementioned text book by Macleod; and in this case the rate of change of apparent surface height with thin film thickness. is given by $G_k$:

$$G_k = \frac{\lambda_0 \cos\bar{\theta}}{4\pi} \cdot \frac{\partial \varphi}{\partial z_k}$$

Accordingly, where the interferometer system includes such an objective, the electrical field should be integrated over the numerical aperture for that objective to yield a net field reflectance to replace the electrical field reflectance r in equation 34. Otherwise the apparatus functions in the manner described above.

Figure 7:
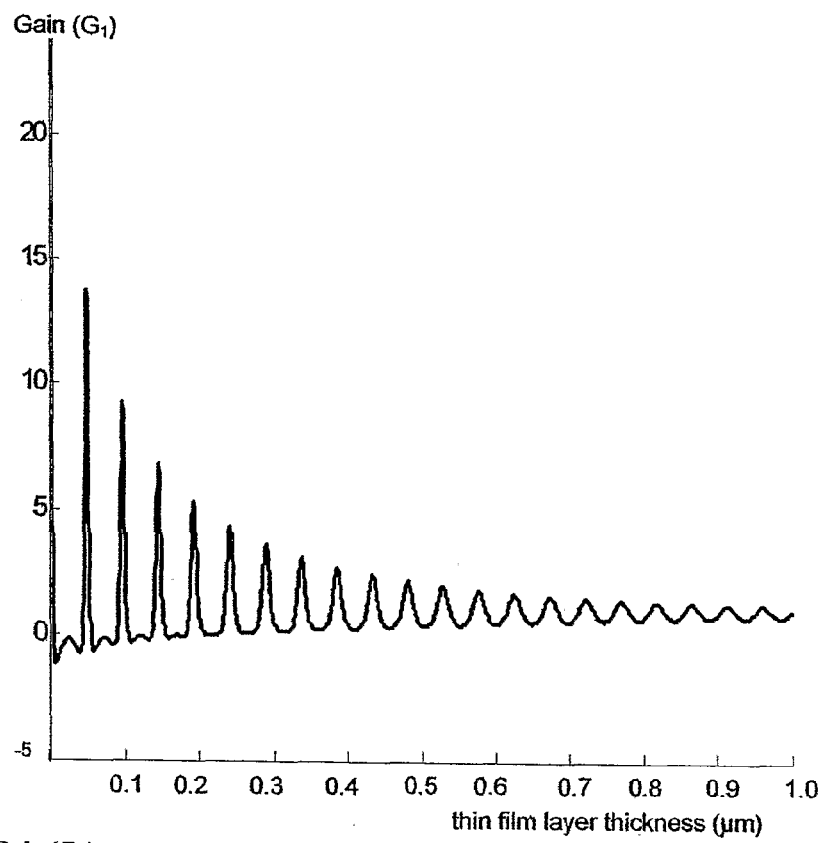
FIG. 7 shows a graph of the gain determined by the gain determiner against optical thickness for a silicon film on a silicon dioxide substrate where the interferometer is a 450 nm wavelength interferometer with a ×50 magnification Mirau objective.
Figure 8:
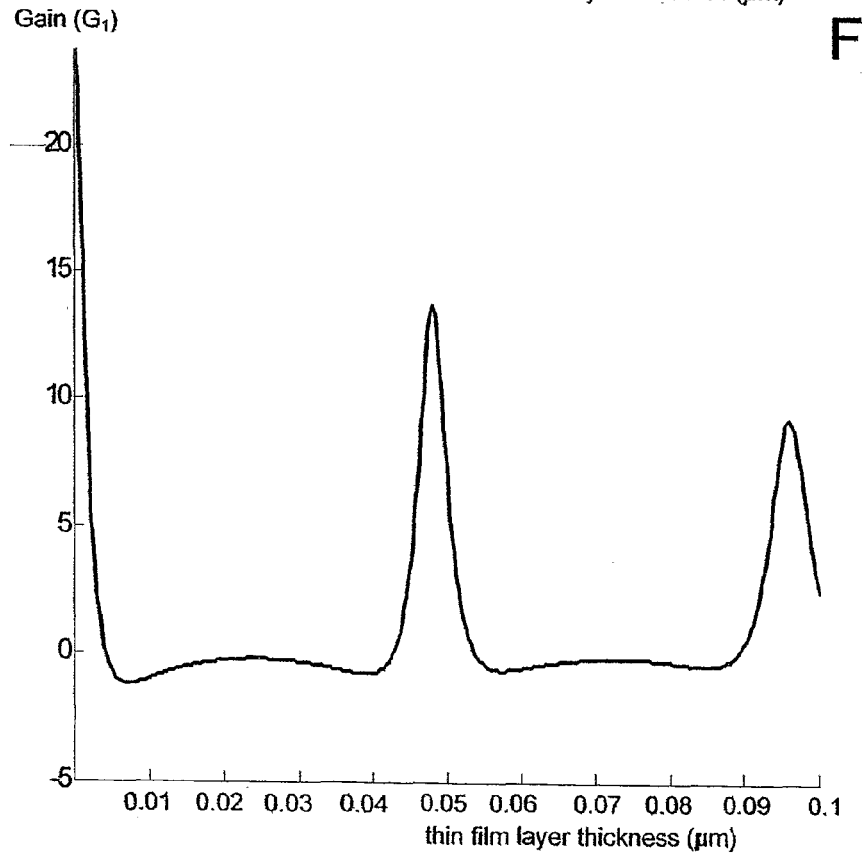
FIG. 8 shows part of the graph show in FIG. 7 on an enlarged scale.

FIG. 7 shows a graph of gain $G_1$ against thickness in micrometers (urn) for a silicon thin film on a silicon dioxide substrate where the interferometer system is configured for phase-shifting interferometry and has a measurement wavelength of 450 nm (nanometers) and a ×50 Mirau interference objective. For a high refractive index film on a low refractive index substrate, the gain maxima occur at half wavelength locations. FIG. 8 shows part of the graph of FIG. 7 on an enlarged scale. Further results have show that increasing the measurement wavelength causes the gain maxima to decay more gradually with the gain maxima decay being far more gradual for a measurement wavelength of 600 nm than for a measurement wavelength of 450 nm. As mentioned above, the thickness of the layers on which the surface roughness measurements are made may be selected to correspond to a peak in the corresponding gain curve so as to maximise the signal-to-noise ratio.

As described above, the interferometer system is configured as a phase shifting interferometer system. The apparatus shown in FIG. 1 may also be configured as a coherence scanning interferometer system. Further details of one example of a coherence scanning interferometer system 2 that may be used in the apparatus 1 will now be described with the aid of FIG. 9 which shows an overall functional block diagram of the apparatus 1, FIG. 10 which shows a simplified side elevational view of the interferometer system 2 and FIG. 11 which shows a graph of intensity I against position Z to illustrate an example of the interference fringes (the axial interferogram) produced by coherence scanning interferometry for a sample surface pixel around a coherence peak or interference region.

Figure 9:
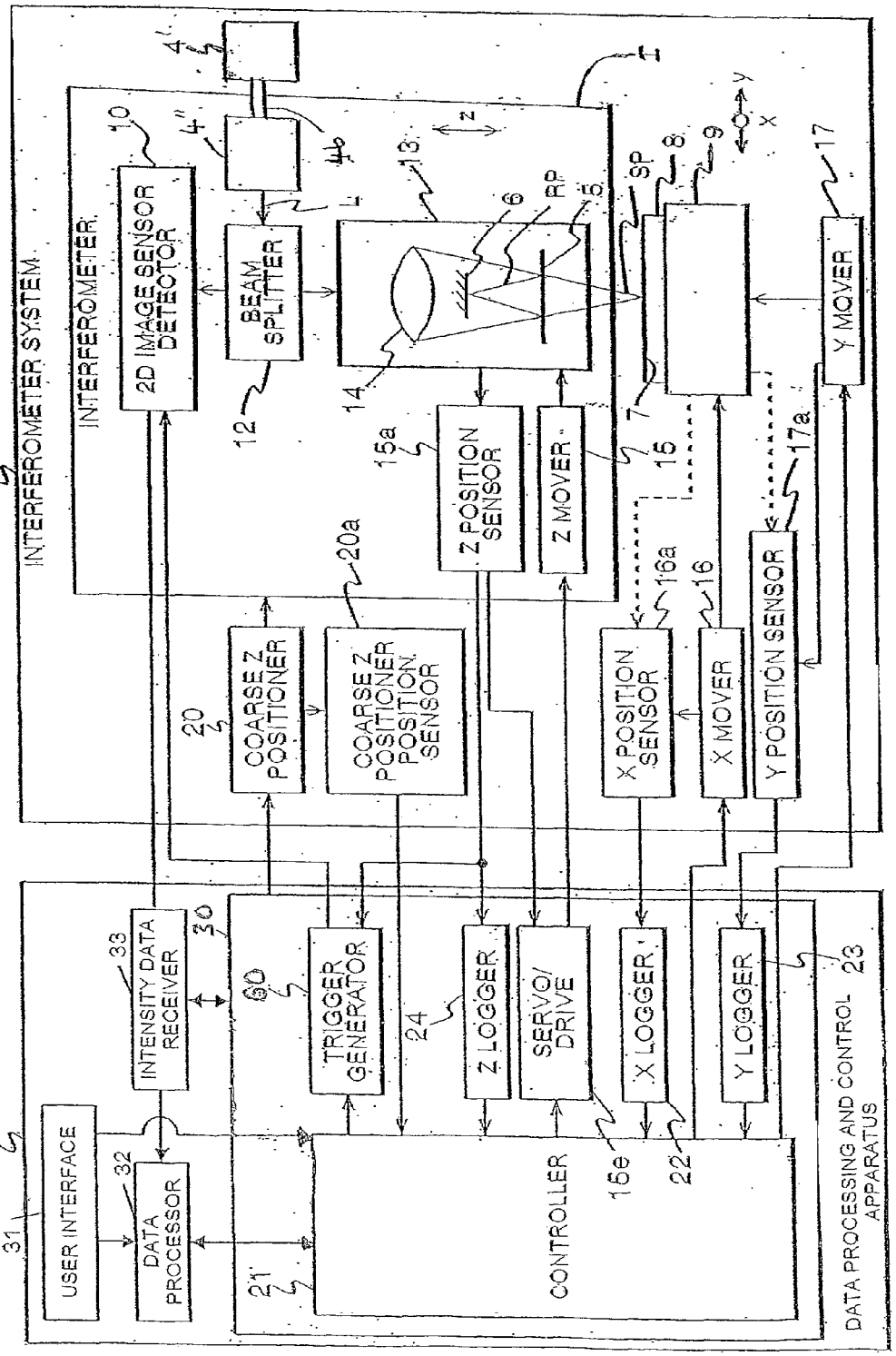
FIG. 9 shows a functional block diagram of apparatus embodying the invention in greater detail than shown in FIG. 1 and where the apparatus is configured to carry out coherence scanning interferometry.
Figure 10:
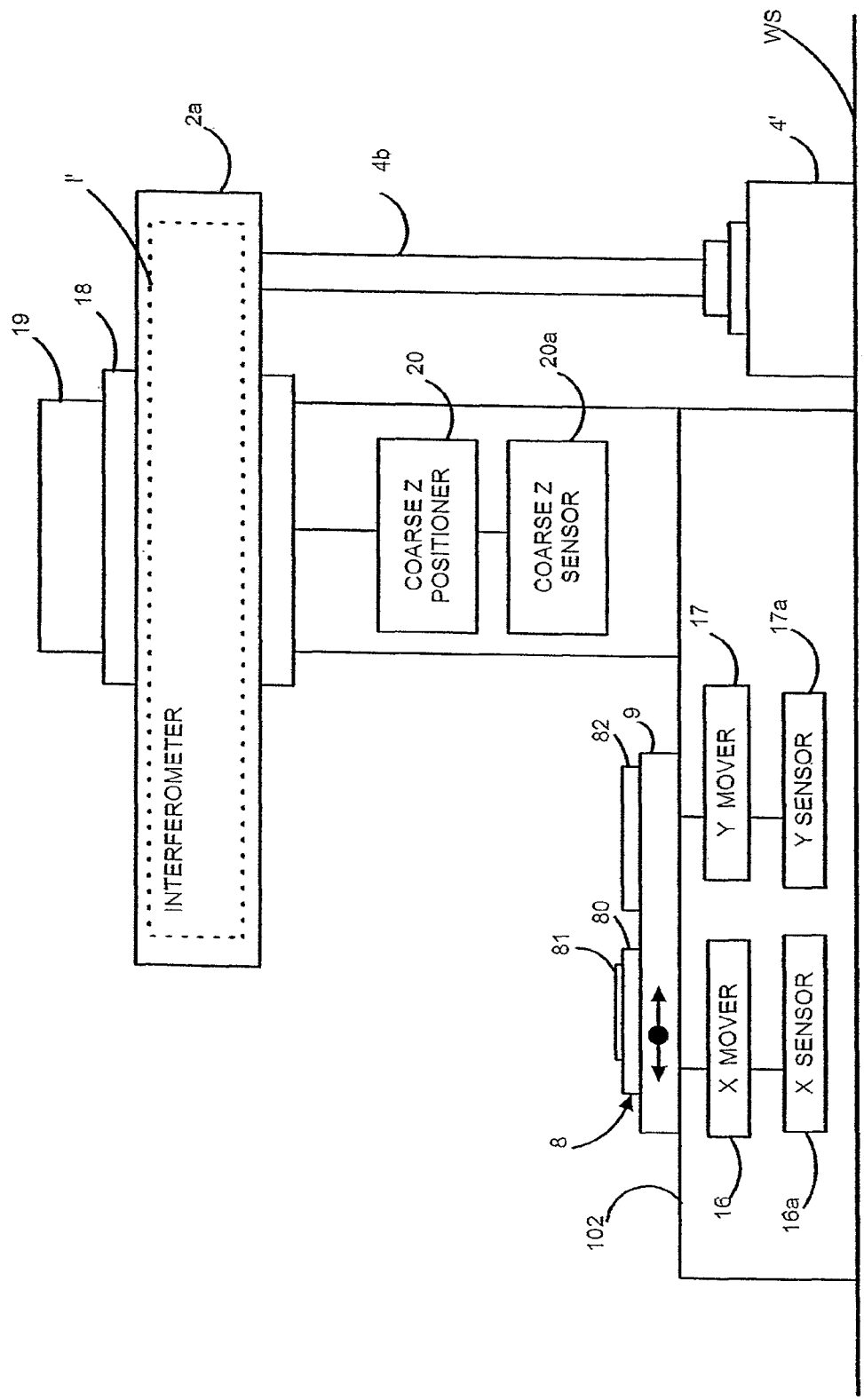
FIG. 10 shows a simplified side-elevational, part sectional view of one example of a suitable interferometer system for use in the apparatus shown in FIG. 9.

In the example shown in FIGS. 9 and 10, the coherence scanning interferometer system 2 is based on a Mirau type interferometer.

As shown in FIG. 9, an interferometer I of the broadband scanning interferometer system 2 has a broadband source 4 having first and second components 4' and 4" optically coupled by an optical fibre cable 4b. The first component 4' houses a quartz halogen projector bulb (with associated reflector). The second component comprises a series of optical elements through which light from the optical fibre cable 4b is transmitted. In this example, the series consists of a diffuser, a changeable filter, an aperture stop, a lens, a field stop and a collimating lens that provides an emergent light beam L. The filter may be a neutral density filter or a band pass filter, designed to restrict the wavelength range of the light emitted by the broadband source 4, such as a Helium-Neon laser line filter designed to pass light having a Helium-Neon laser line wavelength.

The second component 4" of the broadband light source is arranged to supply broadband light L via a beam splitter 12 to an objective lens assembly 13 which includes, in addition to an objective lens 14, the beam splitter 5 and the reference mirror 6. The beam splitter 5 splits the light beam provided by the beam splitter 12 into a first reference beam that is directed along the reference path RP and a second sample beam that is directed along the sample path SP from the interferometer I towards the surface 7 of the thin film structure mounted on the sample support stage 9. Light returned to the beam splitter 12 is reflected towards the detector by the beam splitter and focussed onto the detector 10 by lens 3 (see FIG. 1).

The objective lens assembly 13, and thus the reference mirror 6, is movable in the Z direction by a Z direction mover 15, in this example a piezoelectric mover, under the control of servo/drive circuitry 15e of the control apparatus 30. The sample support stage 9 is movable in X and Y directions by an X mover 16 and a Y mover 17, respectively, to enable different areas of the sample surface 7 to be brought within the field of view of the detector 10.

As shown in FIG. 10, the majority F of the components of the interferometer I of the broadband scanning interferometer system 2 (apart from first component 4' of the light source and the optical fibre cable 4b) are provided within a housing 2a mounted via a carriage 18 to a Z axis datum column 19. The carriage 18 is coupled via a drive mechanism (not shown) such as a ball screw or lead screw drive mechanism to a coarse Z positioner 20 in the form of a manually operable control or, in this example, a DC motor that enables the carriage 18 and thus the interferometer I to be moved up and down the column 19 in the Z direction to enable the interferometer to be moved to different scanning start positions.

As shown in FIG. 10, the sample support stage 9 is provided on a support 102 which houses the X and Y movers 16 and 17. The X and Y movers 16 and 17 comprise, in this example, DC motors coupled to the sample support stage 9 by appropriate conventional drive mechanisms such as rack and pinion or ball screw drive mechanisms (not shown). As shown in FIGS. 9 and 10, each of the Z, X and Y movers is associated with a corresponding position sensor 15a, 16a and 17a while the coarse Z positioner 20 may be associated with a coarse Z positioner position sensor 20a. The dashed lines between the support stage 9 and the X and Y position sensors 16a and 17a in FIG. 3 indicate that the position sensors may sense movement of the support stage 9 directly, rather than by signals derived from the corresponding motor.

The controller 21 of the control apparatus 30 controls overall operation of the apparatus and communicates with the user interface 31 and data processor 32. The control apparatus 30 also includes, in this example, the servo drive circuitry 15e and X, Y and Z loggers 22, 23 and 24, each of which receives the output of the corresponding position sensor 16a, 17a and 15a, and a trigger generator 60 for triggering operation of the detector 10 in response to the output of the Z position sensor 15a to capture images at the required intervals. The controller 21 also receives an output from the coarse Z positioner position sensor 20a, if provided. The controller 21 may be programmed in known manner to compensate for any error in the Z position due to the slight arcuate nature of the motion of the objective lens assembly 13.

Figure 11:
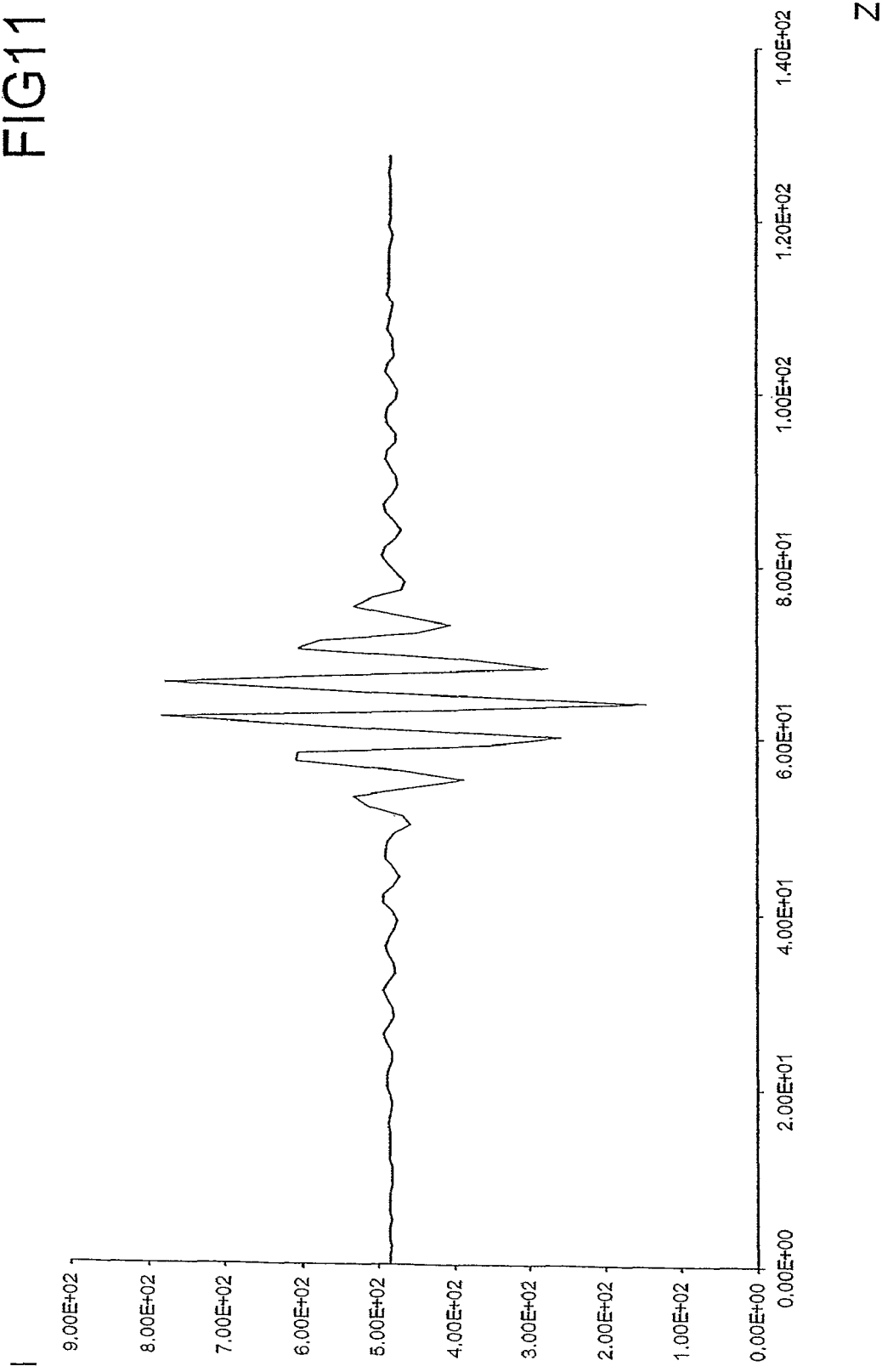
FIG. 11 shows a graph of intensity I against position Z to illustrate an example of the interference fringes (axial interferogram) produced by coherence scanning interferometry for a sample surface region around a coherence peak or interference region.

In operation of the coherence scanning interferometer system, the intensity of the illumination sensed by one sensing element of the 2D sensing array (that is the portion of the interference pattern provided by light reflected from the corresponding surface region or surface pixel of the sample surface 7 imaged on that sensing element) varies as the path length difference changes with movement of the reference mirror 6, resulting in a series of fringes which have a coherence peak at the position along the scan path corresponding to zero path length difference. FIG. 11 shows a graph of light intensity against position Z to illustrate the manner in which the intensity of the light sensed by a sensing element of the 2D sensing array of the detector 10 (and thus the interference fringe region) changes as the relative positions of the reference mirror 6 and sample surface 7 change. The envelope of the intensity distribution is the Fourier transform of the spectral distribution of the broadband source, modified by the spectral transmission of the instrument together with the spectral responsivity of the detector.

The apparatus described above with reference to FIGS. 9 to 11 is similar to that described in the applicant's international application publication number WO03/078925, the whole contents of which are hereby incorporated by reference. Further details of a typical example of the coherence scanning interferometer system 2 and the control apparatus 30 described with reference to FIGS. 9 and 10 may be found in WO03/078925. An example of a commercially available apparatus that may be used is the TalySurf CCI 3000 produced by Taylor Hobson Limited of Leicester, England.

The apparatus being described differs from that disclosed in WO03/078925 in the manner set out above with reference to FIG. 1, namely in that it is specifically intended for use in determining surface characteristics of a thin film structure with a data processor providing, as shown in FIG. 1, a gain determiner 100 and a surface characteristic determiner 101.

The manner in which the gain determiner 100 and the surface characteristic determiner 101 operate where the interferometer system is configured as a coherence scanning interferometer system will now be described.

Where the interferometer system is configured as a coherence scanning or broad band interferometer system, then the gain determiner 100 will not calculate the gain in the manner described above because those calculations assume a single wavelength.

From equation 10, it is apparent that the gain $G_k$ for the $k^{th}$ layer can be expressed by:

$$G_k = \frac{\partial z_{app}}{\partial z_k} \quad (32)$$

The gain determiner 100 determines the gain values $G_k$ by modelling or simulating the performance of the coherence scanning interferometer system for the thin film structure to be measured using data provided by the user for the thin film to be measured including the substrate complex refractive index and the complex refractive index (n-ik) and the thickness $z_k$ for each thin film of the thin film structure.

Initially, the gain determiner 100 evaluates the net spectral reflectance of the thin film structure in accordance with:

$$G_k = \frac{\partial z_{app}}{\partial z_k} \approx \frac{z_{app}^+ - z_{app}^-}{2\Delta z} \quad (33)$$

where $z_{app}^+$ and $z_{app}^-$ correspond respectively to the simulated interferometer z-response to having the $k^{th}$ thin film layer incremented and decremented by $\Delta z$. These apparent surface height changes are derived from the corresponding simulated interferograms through the approach described in WO03/078295. Thus from a functional point of view, $$z_{app} = z_{app}(\overline{z_i}) \quad (34)$$

Regarding the simulated interferograms, these are derived using the relationship presented in WO2006/005959:

$$I(\overline{z_j}) = Re\left\{\mathscr{F}\left(e^{i4\pi\nu\overline{\Delta z}}\overline{A_R}(\nu)\overline{A_S}(\nu)e^{i\overline{\Delta\phi}(\nu)}\right)\right\} \quad (35)$$

where $I(z_i)$ is the simulated interference intensity at the $i^{th}$ z location along the scan path, the reflected electrical field term corresponding to the thin film assembly under the objective, $\overline{A_S}(\nu)e^{i\overline{\Delta\phi}(\nu)}$, is obtained through taking advantage of the plane-wave angular spectrum approach discussed above where the original s and p field reflectances are evaluated using, say, the standard matrix-based approach as presented in Macleod, Thin-Film Optical Filters, the $k^{th}$ layer-thickness perturbation-induced term $e^{i4\pi\nu\overline{\Delta z}}$ is similarly obtained via the plane-wave angular spectrum approach and the instrument 'optical bandwidth' amplitude term $\overline{A_R}(\nu)$ is obtained from the measured amplitude of the positive frequency sideband corresponding to the measurement of a 'spectrally-flat' sample such as BK7 glass.

In summary then, this simulation takes the form of evaluating the net spectral electrical field reflectance, of then generating the corresponding axial-interferogram before finally subjecting this to the procedure described in WO03/078295 to extract the apparent surface height, $z_{app}$. Perturbing the film thickness therefore gives direct access to $G_k$ through numerical differentiation.

Figure 12:
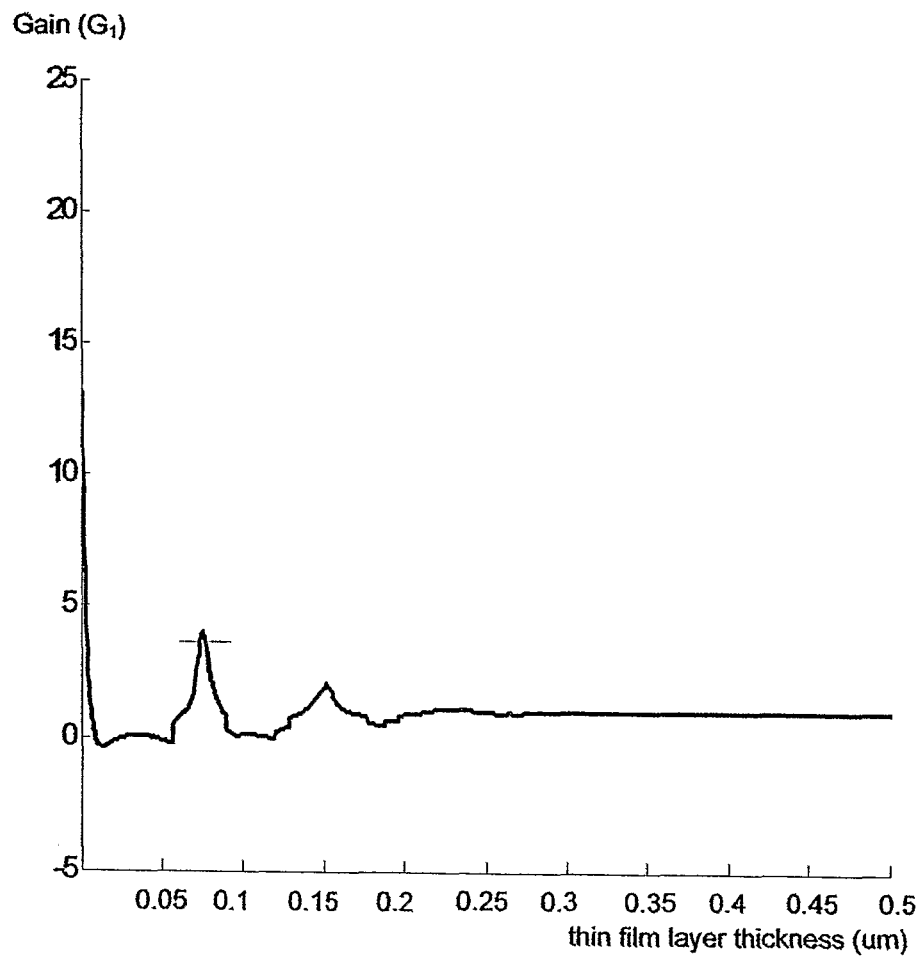
FIG. 12 shows a graph of the gain determined by the gain determiner against optical thickness for a silicon film on a silicon dioxide substrate where the apparatus is configured to carry out coherence scanning interferometry and has a ×50 magnification Mirau objective.

FIG. 12 shows a graph of gain against thin film thickness to illustrate an example of the gain data determined by the gain determiner 100 where the interferometer system comprises a coherence scanning interferometer system with a ×50 Mirau objective lens assembly and where the thin film structure comprises a single thin film of silicon on a silicon dioxide substrate. As can be seen by comparing FIG. 12 with FIG. 8, the main effect of the broadband light source is to integrate out the gain maxima.

Where the interferometer system is configured as a coherence scanning interferometer, then the surface characteristic determiner 101 may determine the actual interfacial surface roughness in the manner described above for the case of the monochromatic phase shifting interferometer which requires the user to provide the thin film mean thickness(es).

As another possibility, where the interferometer system is configured as a coherence scanning interferometer, then the surface characteristic determiner 101 may determine the thin film mean thickness(es) using the techniques described in WO2006/005959, the whole contents of which are hereby incorporated by reference. Although this can be a relatively slow process, for a multilayer (or single layer) thin film it allows the thin film mean thickness(es) and mean geometric path length difference (which corresponds to z) between the measurement and reference arms to be determined, provided that care is taken to ensure that the substrate and thin films are as flat as possible and are parallel to the reference mirror of the interferometer.

Thus, in this example, the surface characteristic determiner 101 has the functionality of and carries out the operations of the layer structure determiner of WO2006/005959 and is operable to request the controller to prompt the user to input the dispersive refractive index $n_{base}$ of the substrate and then to cause the apparatus to conduct in either order: 1) a scan of a surface area of the substrate so that a set of intensity data is received by the intensity data receiver 33 for that surface area of the substrate for each scan interval along the scan path; and 2) a scan of a surface area of the surface of the thin film layer assembly so that a set of intensity data is received by the intensity data receiver 33 for that surface area of the layer structure for each scan interval along the scan path.

The surface characteristic determiner 101 then carries out a frequency transformation process to provide frequency transformed intensity data for both the substrate and the thin film layer assembly intensity data. In this example, the frequency transformation is a Fourier transformation process and the frequency transformer is arranged to carry out a Fast Fourier Transform (FFT) procedure. The well-known ($2^n$) FFT may be used, although other forms of Fourier transform such as the Winograd Fourier transform (which is not based on powers of 2) could be used.

The surface characteristic determiner 101 then determines, under the control of the controller 21, the ratio between the positive frequency space sidebands of the Fourier transforms $(\mathscr{F}(I_{thin}(Z_i)))_{SB+}$ and $(\mathscr{F}(I_{base}(Z_i)))_{SB+}$ of the intensity data (if both transforms exceed a threshold, typically set at 5% of their maximum value) for the thin film layer assembly and the substrate, respectively, multiplied by a field reflectance term to provide a normalised HCF($v$) ratio. The field reflectance term consists of the difference between the dispersive refractive index of free space (set at 1) and the dispersive refractive index $n_{base}(v)$ of the substrate divided by the sum of the dispersive refractive index of free space and the dispersive refractive index of the substrate. The surface characteristic determiner 101 can thus calculate the normalised HCF($v$) ratio:

$$HCF(v) = \left(\frac{1-n_{base}(v)}{1+n_{base}(v)}\right)^* \frac{\mathscr{F}_{thin}(I(Z_i))_{SB+}}{\mathscr{F}_{base}(I(Z_i))_{SB+}} \qquad 36)$$

where * indicates the complex conjugate of the bracketed term (the "n base ratio"). Where the substrate is non-absorbing, then the bracketed term will be real and its complex conjugate will be the same. In the interests of generality, however, the reference to the complex conjugate has been retained throughout this description.

The surface characteristic determiner 101 then sets the calculated normalised HCF ratio equal to an optical admittance ratio term, E(v):

$$HCF(v) \equiv a_{HCF}(v)e^{i\varphi_{HCF}(v)} \qquad 37)$$
$$= \left(\frac{1-n_{base}(v)}{1+n_{base}(v)}\right)^* \frac{\mathscr{F}_{thin}(I(Z_i))_{SB+}}{\mathscr{F}_{base}(I(Z_i))_{SB+}}$$
$$= r(v)e^{-i(\varphi(v)+4\pi v(\Delta z - \Delta z_{base}))}$$
$$= r(v)e^{-i\varphi(v)}e^{-i4\pi v \Delta z_{HCF}}$$
$$\equiv E(v)$$

where $$E(v) \equiv a_E(v)e^{i\varphi_E(v)} = \left(\frac{1-Y^*(v)}{1+Y^*(v)}\right)e^{-i4\pi v \Delta z_{HCF}} \qquad 38)$$

where * indicates the complex conjugate of the bracketed term, r is the electrical field reflectance from the thin film layer assembly, Y is the optical admittance of the thin film layer assembly (which, as will be explained below, is dependent upon the following parameters: the number of layers in the thin film layer assembly, the thickness of each layer in the thin film layer assembly and the dispersive refractive index of each layer in the thin film layer assembly), and the exponent is a helical phase term, the derivation of which is explained in WO2006/005959.

If the small angle approximation is not appropriate for the NA, then from above the HCF function may be approximated by:

$$HCF(v) \equiv a_{HCF}(v)e^{i\varphi_{HCF}(v)} \qquad 39)$$
$$= \frac{1}{2}\int_0^{\pi/2}\left(\frac{1-\eta^p_{base}(v,\theta)\cos\theta}{1+\eta^p_{base}(v,\theta)\cos\theta} + \frac{1-\eta^s_{base}(v,\theta)/\cos\theta}{1+\eta^s_{base}(v,\theta)/\cos\theta}\right)$$
$$w(\theta)d\theta \frac{\mathscr{F}_{thin}(I(z_i))_{SB+}}{\mathscr{F}_{base}(I(z_i))_{SB+}}$$
$$\approx \overline{r(v)}e^{-i\overline{\varphi(v)}}e^{-i4\pi v \Delta z_{HCF}\cos\theta_o} \equiv E(v)$$

where $$E(v) \equiv a_E(v)e^{i\varphi_E(v)} \qquad 40)$$
$$= \frac{1}{2}\int_0^{\pi/2}\left(\frac{1-Y^*_p(v,\theta)\cos\theta}{1+Y^*_p(v,\theta)\cos\theta} + \frac{1-Y^*_s(v,\theta)/\cos\theta}{1+Y^*_s(v,\theta)/\cos\theta}\right)$$
$$e^{-i4\pi v \Delta z_{HCF}\cos\theta}w(\theta)d\theta$$

The surface characteristic determiner 101 then requests the user to provide the number of layers, approximate refractive indices and approximate thicknesses of the layers of thin film layer assembly together with an approximate or accurate value for the dispersive refractive index of the substrate and uses these in a thin film optimisation approach to extract the dispersive refractive index and thickness for each layer of the thin film layer assembly. The fitting procedure of the thin film optimisation approach may be, for example, a conjugate gradient method or a simulated annealing method as discussed in WO2006/005959 and as discussed in 'Numerical Recipes in Fortran: The Art of Scientific Computing, Second Edition' by William H. Press, Saul A., Teukolsky, William T. Vettering and Brian R. Flannery (ISBN 0-521-43064) in section 10.6 at pages 413 to 416 and section 10.9 at pages 436 to 438.

Thus, the local thickness of each layer (that is the thickness corresponding to a selected surface pixel or group of contiguous pixels) and its dispersive index is extracted by setting a ratio, the HCF ratio, related to the ratio between Fourier transforms of the intensity data (in the example described above the ratio of the positive frequency space sidebands of the Fourier Transforms) equal to an optical admittance ratio term that allows the use of thin film fitting procedures to extract the layer characteristics and that makes use of both the amplitude and the phase information available from the measurement operations.

In this case, the surface characteristic determiner 10 determines the HCF ratio or function in the manner discussed above and described in WO2006/005959 for a number of different locations within the field of view of the coherence scanning interferometer. The surface characteristic determiner 101 then determines a mean HCF function from the obtained HCF functions.

The mean HCF function is given by:

$$\overline{HCF}(v) = \overline{r^*}(v)e^{-i4\pi v \cos\overline{\theta}(\overline{\Delta z} - \overline{\Delta z_{ref}})} \qquad 41)$$

and in accordance with WO2006/005959, the mean HCF function for a thin film structure may be defined as:

$$\overline{HCF}(v) = \overline{r^*}(v)e^{-i4\pi v \cos\overline{\theta}\Delta z_{HCF}} = |\overline{r}(v)|e^{-i\overline{\chi}(v)}e^{-i4\pi v \cos\overline{\theta}(\overline{z_{subs}} - \overline{z_{ref}} + \sum_{k=1}^{N}\overline{z_k})} \qquad 42)$$

Considering perturbations of both the thin film layer and the substrate by taking the differential gives:

$$d(\overline{HCF}(v)) = (-i4\pi v\cos\overline{\theta})|\bar{r}(v)|e^{-i\bar{\chi}(v)}e^{-i4\pi v\cos\overline{\theta}\Delta z_{HCF}}dz_{subs} + \qquad (43)$$

$$\sum_{k=1}^{N}(-i4\pi v\cos\overline{\theta})|\bar{r}(v)|e^{-i\bar{\chi}(v)}e^{-i4\pi v\cos\overline{\theta}\Delta z_{HCF}}dz_k +$$

$$\sum_{k=1}^{N}(-i)|\bar{r}(v)|e^{-i\bar{\chi}(v)}e^{-i4\pi v\cos\overline{\theta}\Delta z_{HCF}}\frac{\partial \chi}{\partial z_k}dz_k$$

so that $$d(\overline{HCF}(v)) = (-i4\pi v\cos\overline{\theta})|\bar{r}(v)|e^{-i\bar{\chi}(v)}e^{-i4\pi v\cos\overline{\theta}\Delta z_{HCF}} \qquad (44)$$

$$\left(dz_{subs} + \sum_{k=1}^{N}\left(1 + \frac{1}{4\pi v\cos\overline{\theta}}\frac{\partial \chi}{\partial z_k}\right)dz_k\right)$$

$$= -i4\pi v\cos\overline{\theta}\,\overline{HCF}(v)\left(dz_{subs} + \sum_{k=1}^{N}G_k(v)dz_k\right)$$

using the definition of $G_k$ above.

Thus, the differential of the mean HCF function is given by:

$$d(\overline{HCF})(v) = -i4\pi v\cos\overline{\theta}\,\overline{HCF}(v)\left(dz_{subs} + \sum_{k=1}^{N}G_k(v)dz_k\right) \qquad (45)$$

In this example, the surface characteristic determiner 101 considers the HCF function for a surface pixel (i,j) as a perturbation from the mean HCF function:

$$HCF_{ij}(v) = \overline{HCF}(v) - i4\pi v\cos\overline{\theta}\,\overline{HCF}(v)\left(dz_{subs} + \sum_{k=1}^{N}G_k(v)dz_k\right) \qquad (46)$$

where cos $\overline{\theta}$ is 1 for low numerical aperture,
and determines, for that surface pixel, the substrate and the thin film layer thicknesses, $dz_{subs}$, $dz_1$, $dz_2$, ... $dz_N$, by using a standard least-mean squares fitting procedure or other suitable fitting or optimisation procedure. Of course, the Taylor expansion of equation 46 above could be extended beyond the first order which would make the procedure more forgiving in the event of lack of flatness or tilt of the sample being measured.

The surface characteristic determiner 101 repeats this procedure for other surface pixels within the field of view so generating the topography of each interface of the thin film structure, from which the surface roughness Sq can then be derived as discussed above by summing the individual layer topographies and the substrate topography.

As in the case of the monochromatic interferometer, if the gain determiner 100 calculates any of the gains as being approximately zero, then the gain determiner 100 will instruct the controller 21 to advise the user that no gain compensation will be feasible because of the poor signal to noise ratio and, if a different central measurement wavelength is available for the coherence scanning interferometer, will advise the user that the central measurement wavelength should be changed to change the gain. If this is not possible then the controller 21 will advise the user via the user interface 31 that interferometric measurement of the thin film sample should be abandoned.

The above-described techniques for determining interfacial surface roughness and/or thin film mean thickness $T_j$ may be used for thin film structures comprising thin films of any reasonably transmissive materials that enable interference effects to be observed. Generally, the thin films will be dielectrics or semiconductors. Examples of possible thin film materials include titanium dioxide ($TiO_2$), tantalum oxide ($Ta_2O_5$), silicon dioxide ($SiO_2$), Zirconium dioxide ($ZrO_2$), silicon.

The present invention may be applied to forms of interferometry other than those discussed above.

The above description assumes that the spectral range of light source is in the visible. It could, however, extend into or lie within the infra red or ultra violet regions of the spectrum.

Figure 13:
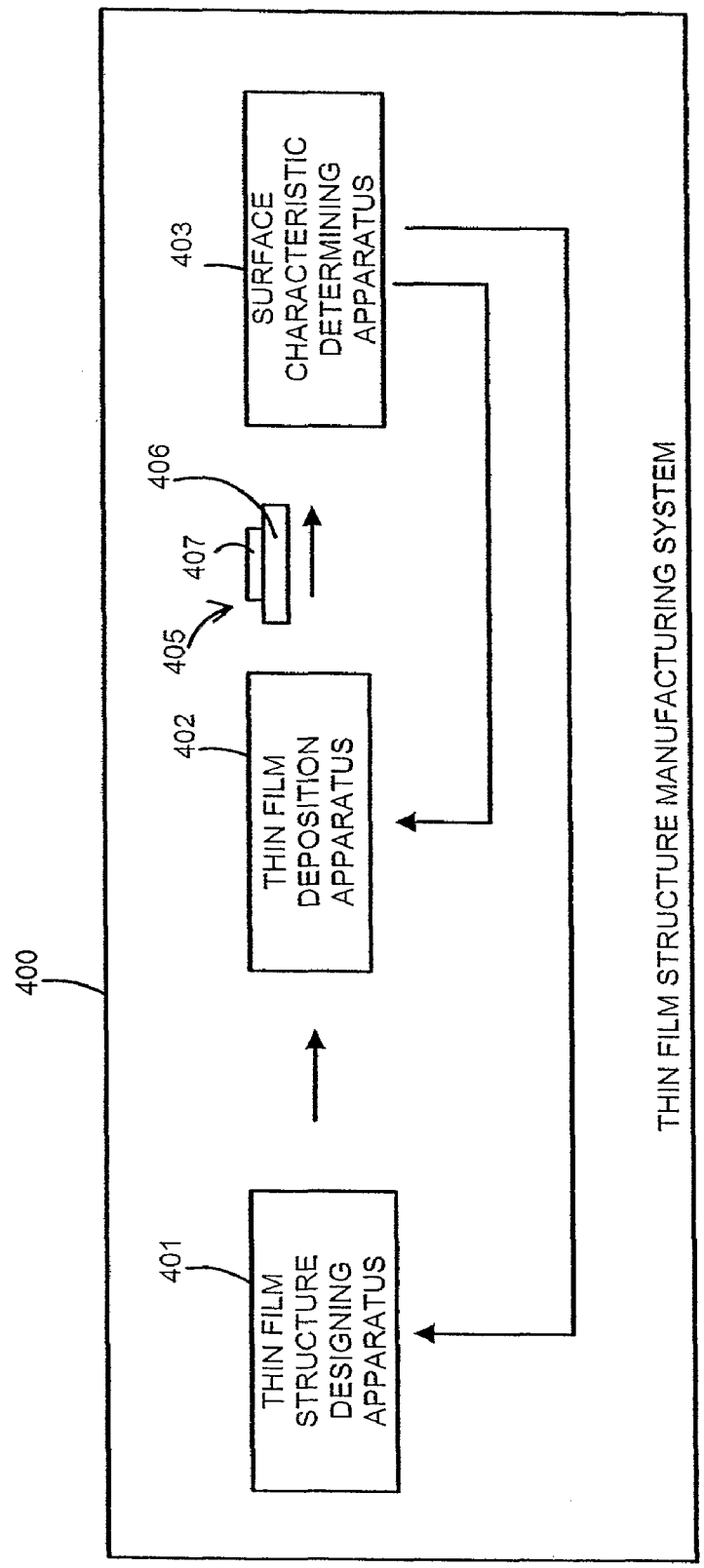
FIG. 13 shows a simplified block diagram of a thin film structure manufacturing system.

The apparatus described above may form part of a thin film manufacturing system. FIG. 13 shows a simple block diagram of a thin film manufacturing system 400 comprising thin film designing apparatus 401 that comprises, generally, computing apparatus similar to that shown in FIG. 2 programmed: to receive input from a user or operator identifying the features required of the thin film structure such as the required base or substrate, the materials to be used to form the thin film structure, the number of thin film layers and for example the optical characteristics (such as the optical admittance) required of the thin film structure; and to design a thin film structure consisting of layers of the user selected materials having thicknesses that provide the required optical characteristic following, for example, the teaching of the aforementioned text book "Thin-Film Optical Filters" by H Angus Macleod (ISBN 07503 0688 2). As another possibility, the user may specify the thicknesses and number of thin film layers in the structure. The thin film designing apparatus 401 provides control instructions for enabling a thin film deposition apparatus 402 to cause the required thin film layer structure to be produced. The thin film deposition apparatus 402 may be configured to form thin film layer(s) 405 on the base or substrate 406 using any known thin film deposition technique(s) such as sputtering, Low Pressure Chemical Vapour Deposition (LPCVD), Metal Organic Vapour Deposition (MOCVD), Molecular Beam Epitaxy (MBE) and so on. Once the thin film layer(s) have been deposited, the resulting thin film structure 404 is passed to a surface characteristic determining apparatus 403 which is constructed and operates as described above to determine a surface characteristic or characteristics of a produced thin film structure. The surface characteristic determining apparatus 403 may provide control information for at least one of the thin film designing apparatus 401 and the thin film designing apparatus 401 to enable the designing and/or manufacturing process to be modified in accordance with the surface characteristic or characteristics determined by the surface characteristic determining apparatus 403.

The invention claimed is:
1. Apparatus for determining information relating to a surface characteristic of a sample in the form of a thin film structure comprising one or more thin film layers on a substrate, the apparatus comprising:
   a light source;
   a beam splitter configured to direct light from the light source along a sample path towards a surface region of a said sample and along a reference path towards a reference surface such that light reflected by a sample surface region and light reflected by the reference surface interfere;
   a mover configured to effect relative movement along a measurement path between a sample and the reference surface; a sensing device configured to sense light representing the interference fringes produced by a sample surface region;

a controller configured to carry out a measurement operation by causing the sensing device to sense light intensity at a number of locations along the measurement path to provide, for each location, a corresponding intensity value; and a data processor configured to receive first intensity data comprising a first series of intensity values resulting from a measurement operation on a surface area of a substrate and second intensity data comprising at least a second series of intensity values resulting from a measurement operation on a surface area of a thin film structure, the data processor comprising:

a gain determiner configured to determine a gain for the or each thin film of a thin film structure; and a surface characteristic determiner configured to determine a substrate surface characteristic on the basis of the first intensity data, to determine an apparent thin film structure surface characteristic on the basis of the second intensity data, and to modify the apparent thin film structure surface characteristic using the substrate surface characteristic and the gain or gains determined by the gain determiner.

2. Apparatus according to claim 1, wherein the gain represents the rate of change of the apparent surface height with thin film thickness.

3. Apparatus according to claim 1, wherein the gain is given by $$G_k = \frac{\lambda_o \cos\overline{\theta}}{4\pi} \cdot \frac{\partial \varphi}{\partial z_k}$$

wherein $\cos\overline{\theta}$ is 1 for low numerical aperture.

4. Apparatus according to claim 1, wherein the gain determiner is configured to determine the gain for a thin film layer by determining a value for the refractive index and mean thin film thickness of the thin film layer, calculating a surface reflectance and using the surface reflectance and refractive index to calculate the gain.

5. Apparatus according to claim 1, wherein the light source is a monochromatic light source and the gain determiner is configured to determine the gain for a thin film layer by determining a value for the refractive index and mean thin film thickness of the thin film layer, calculating a surface reflectance and using the surface reflectance and refractive index to calculate the gain.

6. Apparatus according to claim 1, wherein the light source is a monochromatic light source and the gain determiner is configured to determine gain in accordance with:

$$dz_{app} = dz_{subs} + \sum_{k=1}^{m}\left(1 + \frac{1}{4\pi v_o R}\left(\text{Re}(r)\frac{\partial(\text{Im}(r))}{\partial z_k} - \text{Im}(r)\frac{\partial(\text{Re}(r))}{\partial z_k}\right)\right)dz_k = dz_{subs} + \sum_{k=1}^{m} G_k(v_o)dz_k.$$

7. Apparatus according to claim 1, wherein the light source is a monochromatic light source and, where the thin film structure has a single thin film, the gain determiner is configured to determine gain in accordance with:

$$1 + \frac{1}{4\pi v_o R}\left(\text{Re}(r)\frac{\partial(\text{Im}(r))}{\partial z_k} - \text{Im}(r)\frac{\partial(\text{Re}(r))}{\partial z_k}\right).$$

8. Apparatus according to claim 1, wherein the light source is a monochromatic light source and where the thin film structure has a single thin film, the gain determiner is configured to determine gain in accordance with:

$$R = \frac{r_1^2 + r_2^2 + 2r_1 r_2 \cos 2\delta_1}{1 + r_1^2 r_2^2 + 2r_1 r_2 \cos 2\delta_1}$$

$$\text{Re}(r) = \frac{r_1(1 + r_2^2)\cos 2\delta_1 + r_2(1 + r_{12}^2)}{1 + r_1^2 r_2^2 + 2r_1 r_2 \cos 2\delta_1}$$

$$\text{Im}(r) = -\frac{r_1(1 - r_2^2)\sin 2\delta_1}{1 + r_1^2 r_2^2 + 2r_1 r_2 \cos 2\delta_1}$$

$$\frac{\partial \text{Re}(r)}{\partial z_1} = \frac{-2r_1(1 + r_2^2)\sin 2\delta_1 + 4\text{Re}(r)r_1 r_2 \sin 2\delta_1}{1 + r_1^2 r_2^2 + 2r_1 r_2 \cos 2\delta_1}\left(\frac{d\delta_1}{dz_1}\right)$$

$$\frac{\partial \text{Im}(r)}{\partial z_1} = \frac{-2r_1(1 - r_2^2)\cos 2\delta_1 + 4\text{Im}(r)r_1 r_2 \sin 2\delta_1}{1 + r_1^2 r_2^2 + 2r_1 r_2 \cos 2\delta_1}\left(\frac{d\delta_1}{dz_1}\right)$$

where $d_1$ and $\delta_1$ are respectively the physical and phase thickness of the thin film.

9. Apparatus according to claim 1, wherein the apparatus is part of an interferometer system that has a focussing objective and the gain determiner is configured to determine gain by replacing the surface reflectance with a net field reflectance determined by integrating over the numerical aperture of the objective.

10. Apparatus according to claim 1, wherein the controller is configured to cause the locations on the measurement path to be spaced by a predetermined phase and the surface characteristic determiner is configured to determine a surface height of a surface pixel using a phase shifting algorithm.

11. Apparatus according to claim 1, wherein the surface characteristic determiner is configured to determine surface roughness.

12. Apparatus according to claim 1, wherein the surface characteristic determiner is configured to determine surface roughness in accordance with:

$$Sq_{app}^2 = Sq_{subs}^2 + \sum_{k=1}^{m} G_k^2(v_o)T_k^2$$

and $$Sq^2 = Sq_{subs}^2 + \sum_{k=1}^{m} T_k^2$$

13. Apparatus according to claim 1, wherein, where a thin film structure has a single thin film with a surface roughness much greater than that of a substrate, the surface characteristic determiner is configured to determine surface roughness in accordance with:

$$Sq^2 \approx Sq_{app}^2 / G_1^2(v_o)$$

14. Apparatus according to claim 1, wherein the light source is a monochromatic light source, a thin film structure has two thin films and the surface characteristic determiner is configured to determine surface roughness as:

$$Sq^2 = T_1^2 + T_2^2 + Sq_{subs}^2 = \frac{1}{G_{22}^2}\left(Sq_{app}^2(2) + \frac{G_{22}^2 - G_{12}^2}{G_{11}^2}Sq_{app}^2(1) + \left(G_{22}^2 - 1 - \frac{G_{22}^2 - G_{12}^2}{G_{11}^2}\right)Sq_{subs}^2\right)$$

15. Apparatus according to claim 1, wherein: the light source is a broad band light source; the controller is configured to carry out a measurement operation by causing the sensing device to sense light intensity at a number of locations along the measurement path to provide, for a surface region, a series of intensity values representing an interferogram in the measurement path direction; and the data processor is configured to determine a surface height of the surface region by determining the position of a coherence peak in the intensity values for that surface region.

16. Apparatus according to claim 15, wherein the gain is given by:

$$G_k = \frac{\partial z_{app}}{\partial z_k}$$

17. Apparatus according to claim 15, wherein the gain determiner is configured to determine a gain value for a thin film layer by evaluating a net spectral reflectance for the thin film structure using values $z_k$ for the layer thicknesses, using the evaluated net spectral reflectance to generate a corresponding interferogram, determining the position along the measurement path of the coherence peak in that interferogram to obtain an apparent layer thicknesses $z_{app}$, perturbing the layer thickness values $z_k$ by $\partial z_k$ to determine the corresponding change $\partial z_{app}$, in apparent layer thickness and determining the gain $G_k$ on the basis of:

$$G_k = \frac{\partial z_{app}}{\partial z_k}$$

18. Apparatus according to claim 17, wherein the surface characteristic determiner is configured to determine surface roughness.

19. Apparatus according to claim 17, wherein, where a thin film structure has a single thin film with a surface roughness much greater than that of a substrate, the surface characteristic determiner is configured to determine surface roughness in accordance with:

$$Sq^2 \approx Sq_{app}^2/G_1^2(v_o)$$

20. Apparatus according to claim 17, wherein the surface characteristic determiner is configured, to enable determination of a surface characteristic, to determine mean thin film thickness(es) by:
  determining a frequency transform ratio corresponding to a ratio between first intensity data comprising a first series of intensity values resulting from a measurement operation on a thin film layer structure surface area and second intensity data comprising a second series of intensity values resulting from a measurement operation on a surface area of a substrate; and
  fitting a layer structure model having variable model parameters related to the layer thicknesses and refractive indices of the layers of a thin film structure to the ratio determined by the ratio determiner by adjusting the model parameters, thereby obtaining, for the model parameters, values representing the layer thicknesses and refractive indices of the layers of the thin film structure.

21. Apparatus according to claim 20, wherein the surface characteristic determiner is configured to determine first frequency transformed data corresponding to the first intensity data and second frequency transformed data corresponding to the second intensity data and to determine the frequency transform ratio by dividing one of the first and second frequency transformed data by the other of the first and second frequency transformed data and by multiplying that ratio by a field reflectance term:

$$HCF(v) = \left(\frac{1 - n_{base}(v)}{1 + n_{base}(v)}\right)^+ \frac{\mathcal{J}_{thin}(I(Z_i))_{SB+}}{\mathcal{J}_{base}(I(Z_i))_{SB+}}$$

where $n_{base}(v)$ is the refractive index at frequency v of the substrate and + indicates either the ratio or its complex conjugate.

22. Apparatus according to claim 20, wherein the ratio determiner is configured to determine:

$$\begin{aligned}HCF(v) &= a_{HCF}(v)e^{i\varphi_{HCF}(v)}\\ &= \left(\frac{1 - n_{base}(v)}{1 + n_{base}(v)}\right)^* \frac{\mathcal{J}_{thin}(I(Z_i))_{SB+}}{\mathcal{J}_{base}(I(Z_i))_{SB+}}\\ &= \frac{1}{2}\int_0^{\pi/2}\left(\frac{1 - \eta_{base}^p(v,\theta)\cos\theta}{1 + \eta_{base}^p(v,\theta)\cos\theta} + \frac{1 - \eta_{base}^s(v,\theta)/\cos\theta}{1 + \eta_{base}^s(v,\theta)/\cos\theta}\right)\\ &\quad w(\theta)d\theta\frac{\mathcal{J}_{thin}(I(z_i))_{SB+}}{\mathcal{J}_{base}(I(z_i))_{SB+}}\\ &\approx \overline{r(v)e^{-i\varphi(v)}}e^{-i4\pi\Delta z}HCF^{\cos\theta_o}\\ &\equiv E(v)\end{aligned}$$

23. Apparatus according to claim 20, wherein the layer structure model is a thin film layer structure optical admittance model.

24. Apparatus according to claim 20, wherein the layer structure model is a thin film layer structure optical admittance model:

$$E(v) \equiv a_E(v)e^{i\varphi_E(v)} = \left(\frac{1 - Y^+(v)}{1 + Y^+(v)}\right)e^{-i4\pi v\Delta z}HCF$$

where $Y^+$ indicates the optical admittance, or its complex conjugate.

25. Apparatus according to claim 20, wherein the layer structure model is a thin film layer structure optical admittance model:

$$E(v) = a_E(v)e^{i\varphi_E(v)} =$$
$$\frac{1}{2}\int_0^{\pi/2}\left(\frac{1 - Y_p^*(v,\theta)\cos\theta}{1 + Y_p^*(v,\theta)\cos\theta} + \frac{1 - Y_s^*(v,\theta)/\cos\theta}{1 + Y_s^*(v,\theta)/\cos\theta}\right)e^{-i4\pi v\Delta z}HCF^{\cos\theta}w(\theta)d\theta$$

26. Apparatus according to claim 17, wherein, to enable determination of surface roughness, the surface characteristic determiner is configured to determine mean thin film thickness(es) by:

determining a frequency transform ratio, HCF, corresponding to a ratio between first intensity data comprising a first series of intensity values resulting from a measurement operation on a thin film layer structure surface area and second intensity data comprising a second series of intensity values resulting from a measurement operation on a surface area of a substrate; and fitting a layer structure model having variable model parameters related to the layer thicknesses and refractive indices of the layers of a thin film structure to the ratio determined by the ratio determiner by adjusting the model parameters, thereby obtaining for the model parameters values representing the layer thicknesses and refractive indices of the layers of the thin film structure; and wherein the surface characteristic determiner is configured to determine surface roughness by determining a mean of said frequency transform ratios for a number of different surface regions of the thin film structure, determining the differential of the mean frequency transform ratio as being given by:

$$i4\pi v \cos\theta \overline{HCF}(v)\left(dz_{subs} + \sum_{k=1}^{N} G_k(v) dz_k\right)$$

and then carrying out a fitting procedure to determine $dz_{subs}$ and $dz_k$.

27. Apparatus according to claim 15, wherein the surface characteristic determiner is configured to determine surface roughness in accordance with:

$$Sq_{app}^2 = Sq_{subs}^2 + \sum_{k=1}^{m} G_k^2(v_o) T_k^2$$

and $$Sq^2 = Sq_{subs}^2 + \sum_{k=1}^{m} T_k^2$$

28. A method of determining information relating to a surface characteristic of sample in the form of a thin film structure comprising one or more thin film layers on a substrate, the method comprising:

directing light from a light source along a sample path towards a surface region of a sample and along a reference path towards a reference surface such that light reflected by the sample surface region and light reflected by the reference surface interfere;

effecting relative movement along a measurement path between a sample and the reference surface;

carrying out a measurement operation by causing a sensing device to sense light at a number of locations along the measurement path to provide, for each location, a corresponding intensity value; and processing intensity data comprising a first series of intensity values resulting from a measurement operation on a surface area of a substrate and second intensity data comprising at least a second series of intensity values resulting from a measurement operation on a surface area of a thin film structure by determining an apparent substrate surface characteristic of the substrate on the basis of the first intensity data, determining an apparent thin film structure surface characteristic on the basis of the second intensity data, and modifying the apparent thin film structure surface characteristic using the apparent substrate surface characteristic and a determined gain or gains.

29. A non-transient storage medium carrying program instructions for programming processing means to carry out a method in accordance with claim 28.

30. Apparatus for determining information relating to a surface characteristic of sample in the form of a thin film structure comprising one or more thin firm layers on a substrate, the apparatus comprising:

light directing means for directing light from light source means along a sample path towards a surface region of a sample and along a reference path towards a reference surface such that light reflected by a said sample surface region and light reflected by the reference surface interfere;

moving means for effecting relative movement along a measurement path between a sample and the reference surface;

sensing means for sensing light representing the interference fringes produced by a sample surface region;

control means for carrying out a measurement operation by causing the sensing means to sense light intensity at a number of locations along the measurement path to provide, for each location, a corresponding intensity value; and data processing means for receiving first intensity data comprising a first series of intensity values resulting from a measurement operation on a surface area of a substrate and second intensity data comprising at least a second series of intensity values resulting from a measurement operation on a surface area of a thin film structure, the data processing means comprising:

gain determining means for determining a gain for the or each thin film of a thin film structure; and surface characteristic means for determining a substrate surface characteristic on the basis of the first intensity data, for determining an apparent thin film structure surface characteristic on the basis of the second intensity data, and for modifying the apparent thin film structure surface characteristic using the substrate surface characteristic and the gain or gains determined by the gain determining means.

31. Data processing apparatus for receiving from an interferometer first intensity data comprising a first series of intensity values resulting from a measurement operation on a surface area of a substrate and second intensity data comprising at least a second series of intensity values resulting from a measurement operation on a surface area of a thin film structure, the apparatus comprising:

a gain determiner configured to determine a gain for the or each thin film of a thin film structure; and a surface characteristic determiner configured to determine a substrate surface characteristic on the basis of the first intensity data, to determine an apparent thin film structure surface characteristic on the basis of the second intensity data, and to modify the apparent thin film structure surface characteristic using the substrate surface characteristic and the gain or gains determined by the gain determiner.

\* \* \* \* \*